US011978321B2

(12) United States Patent
Dawe

(10) Patent No.: US 11,978,321 B2
(45) **Date of Patent: *May 7, 2024**

(54) INCREASING RESOURCE UTILIZATION IN GAMING APPLICATIONS

(71) Applicant: Cody Michael Dawe, Orangeville (CA)

(72) Inventor: Cody Michael Dawe, Orangeville (CA)

( * ) Notice: Subject to any disclaimer, the term of this patent is extended or adjusted under 35 U.S.C. 154(b) by 59 days.

This patent is subject to a terminal disclaimer.

(21) Appl. No.: 17/826,145

(22) Filed: May 26, 2022

(65) Prior Publication Data

US 2022/0366766 A1 Nov. 17, 2022

Related U.S. Application Data

(63) Continuation of application No. 17/087,603, filed on Nov. 2, 2020, now Pat. No. 11,361,628, and a continuation of application No. 16/271,723, filed on Feb. 8, 2019, now Pat. No. 10,861,292, and a continuation of application No. 15/883,394, filed on Jan. 30, 2018, now Pat. No. 10,249,146.

(51) Int. Cl.
*G07F 17/32* (2006.01)

(52) U.S. Cl.
CPC ........ *G07F 17/3293* (2013.01); *G07F 17/323* (2013.01); *G07F 17/3239* (2013.01); *G07F 17/3276* (2013.01); *G07F 17/3288* (2013.01)

(58) Field of Classification Search
CPC .................................................. G07F 17/3293
See application file for complete search history.

(56) References Cited

U.S. PATENT DOCUMENTS

| | | | |
|---|---|---|---|
| 6,227,969 | B1 | 5/2001 | Yoseloff |
| 6,511,068 | B1 | 1/2003 | Sklansky |
| 8,360,873 | B1 | 1/2013 | Wickett |
| 9,517,413 | B1 | 12/2016 | Wickett |
| 9,607,016 | B1 | 3/2017 | Wickett |
| 10,357,706 | B2 | 7/2019 | Snow |
| 2003/0162424 | A1 | 8/2003 | Berman |
| 2010/0210334 | A1 | 8/2010 | Crawford, Jr. et al. |
| 2011/0207522 | A1 | 8/2011 | Girafi |
| 2013/0029760 | A1 | 1/2013 | Wickett |
| 2013/0059644 | A1 | 3/2013 | Ward |
| 2014/0087806 | A1 | 3/2014 | Snow |
| 2017/0189791 | A1 | 7/2017 | Ventura |
| 2018/0169507 | A1 | 6/2018 | Snow |

*Primary Examiner* — Seng H Lim
(74) *Attorney, Agent, or Firm* — CRGO Global; Steven M. Greenberg

(57) ABSTRACT

A method for enhancing resource utilization in Texas Holdem poker comprises administering a primary Texas Holdem poker round for a plurality of players and, concurrently with the primary Texas Holdem poker round, administering a secondary Texas Holdem poker round among at least some players who have folded out of the primary Texas Holdem poker round. These folded players retain their respective hole cards from the primary Texas Holdem poker round for the secondary Texas Holdem poker round, and the secondary Texas Holdem poker round utilizes at least one otherwise idle resource from the primary Texas Holdem poker round. For physical games played at a table with physical playing cards, the otherwise idle resource(s) comprises table positions of folded players, and for computerized poker games played with virtual playing cards, the otherwise idle resource(s) comprise the remote communication connections between the dealer computer system and the player computer systems.

7 Claims, 24 Drawing Sheets

200
202
212
Poker gaming software module
204
Virtual card dealing module
218
220H
220F
Statistical Engine
216
Connection module
208
Network
214
302
206
210

INCREASING RESOURCE UTILIZATION IN GAMING APPLICATIONS

TECHNICAL FIELD

The present disclosure relates to resource utilization, and more particularly to increasing the effective utilization of otherwise idle resources in gaming applications.

BACKGROUND

So-called "Texas Holdem" (or "Hold-em" or "Hold'em") is a multiplayer card game, based on a conventional 52-card deck, in which the objective is to make the best five card poker hand from a maximum of seven cards or to be the last player willing to play during any betting cycle. Like many card games, it can be played in a physical environment using physical cards, or in a computer environment in which the "cards" are digitally simulated. Thus, unless the context indicates otherwise, the terms "card" and "cards" as used herein shall refer both to physical cards and also to digitally simulated cards.

In a physical environment, the players are usually located in the same room, typically seated around a common table, with the cards being dealt by a dealer who may be a player or a non-player (e.g. a casino employee). In the computer environment, each player uses a player computer system having a remote communication connection (e.g. via one or more third party networks and/or the Internet) to a dealer computer system which simulates shuffling and dealing of the simulated cards using suitable algorithms.

The game format for Texas Holdem is as follows. Each player receives their "hole cards", that is, the initial two cards that are dealt face down in a physical environment, or hidden from other players in a computer environment. The hole cards may be dealt, for example, from a deck of physical cards, or from a queue of computer-simulated cards.

Dealing of the hole cards is followed by a first "betting cycle", which is the sequential wagering by the players of "currency", with the sequence determined by the players' position in the game space. The players' position could be seats at a table in a physical environment, or a queue in a software program. The currency used is any agreed thing that has a value associated with it in the context of the game, regardless of whether it has monetary or other value in the world outside the game. For example, in a physical environment the currency can be money, chips (which may or may not be exchangeable for money), toothpicks, paperclips, peppercorns, or anything else on which the players agree. Moreover, no physical objects need be used, and instead an accounting of what has been wagered may be used. Likewise, in a computer environment the currency can be represented digitally, and may be money that can be redeemed in the larger world, points that have value only within the game (or a larger metagame of which the game is a part) or any other thing. In a computer environment the wagers are typically tracked and maintained by the dealer computer system.

For a given betting cycle, the initial action (wager) is by the player entitled to bet first (in a physical environment, this may be, for example, the player to the immediate left of the dealer). During the betting cycle a player may choose to match the bet, raise the bet or not participate in the game any further, i.e. to "fold". Any currency risked during the betting cycle goes into the main prize pool, referred to as the "pot".

By "folding", the player discards his or her hand (cards) and forfeits interest in the main prize pool.

Following the first betting cycle, a "flop", which consists of three additional cards, is dealt. The flop cards are "community cards", which are visible to all players and used in conjunction with hole cards to form poker hands. For example, if a player's hole cards were the Five of Diamonds (5♦) and the Eight of Clubs (8♣), and the flop cards were the Jack of Hearts (J♥), the King of Spades (K♠) and the Five of Hearts (5♥), the player could form a poker hand including a pair, namely the Five of Diamonds (5♦) and the Five of Hearts (5♥). The flop may be dealt, for example, from a deck of physical cards, or from a queue of computer-simulated cards.

After the flop, there is a second betting cycle during which remaining (i.e. non-folded) players can again match, raise or fold.

After the second betting cycle, a further community card, referred to as the "turn card" or "turn", is dealt. Like the hole cards and flop cards, the turn card may be dealt, for example, from a deck of physical cards, or from a queue of computer-simulated cards. Continuing the above example, if the turn card were the Five of Spades (5♠), the player could now form a "three of a kind" poker hand, namely the Five of Diamonds (5♦), the Five of Hearts (5♥) and the Five of Spades (5♠). The turn card is also sometimes referred to as "Fourth Street" because it is the fourth community card.

After dealing the turn card, a third betting cycle takes place, followed by the dealing of a further community card referred to as the "river card" or "river". Because it is the fifth community card, the river card is sometimes called "Fifth Street". Continuing further with the above example, if the river card were the Eight of Hearts (8♥), the player could now form a "full house" poker hand, namely the Five of Diamonds (5♦), the Five of Hearts (5♥) and the Five of Spades (5♠) together with the Eight of Clubs (8♣) and the Eight of Hearts (8♥). The complete set of community cards, in this case the flop, the turn and the river, is sometimes referred to as the "board".

After the river card is dealt, a fourth betting cycle takes place, after which the player with the best poker hand is determined to be the winner and receives all proceeds from the main prize pool accumulated during the betting cycles. Each player's best poker hand is the best poker hand that they can assemble by combining their hole cards with selected community cards; in some cases a player's best poker hand may simply be the five community cards and such a player is said to "play the board". If at any time during the process there is only one player willing to continue, i.e. if all other players have folded, that player receives the proceeds.

Thus, the procedure is as follows:

Hole cards;
First betting cycle;
Flop;
Second betting cycle;
Turn card;
Third betting cycle;
River card;
Fourth betting cycle;
Winner is determined.

In some embodiments where the game is played in a physical environment, so-called burn cards are used. A burn card is a card dealt from the top of the deck, unseen and unused by the players, between dealing of the hole cards and dealing of the flop, between dealing of the flop and dealing of the turn card, and between dealing of the turn card and dealing of the river card. The use of burn cards developed in the context of games in which one of the players also served as the dealer, and worked to alleviate concerns that the dealer may have engaged in subterfuge, chicanery, skullduggery or other acts of malfeasance. Burn cards are sometimes still used.

The above provides merely an overview of the structure and basic terminology of Texas Holdem, and is not intended to be limiting, as a wide range of variations may be adopted.

In many cases, Texas Holdem games are administered by a business enterprise, such as a licensed casino or the operator of an online gaming system, i.e. the host of a dealer computer system to which player computer systems can establish a remote communication connection. The business enterprise that administers the game will typically draw some sort of revenue from the game. For example, a licensed casino may draw a "rake", that is, a percentage of each pot, possibly up to a maximum amount. As another example, a host of a dealer computer system may charge each player a fee for each game in which they participate. In all cases, the manner in which revenue is obtained will depend on how the game is administered, which to some extent will be dictated by the requirement to comply with all relevant gaming laws. Of course, the business enterprise will need to provide resources for the game, such as a table (and possibly a dealer) in the case of a licensed casino, or computer resources (e.g. one or more servers and a communication architecture) in the case of an operator of an online gaming system. To the extent that the utilization of these resources for revenue generation can be increased, the efficiency of the gaming system will be improved. Just as empty seats on an airplane represent wasted resources in an air travel context, empty seats at a poker table, or unused server and communication capacity in an online gaming system, represent wasted resources in a gaming context.

SUMMARY

Broadly speaking, the present disclosure describes a method for enhancing resource utilization in Texas Holdem poker. The method comprises administering a primary Texas Holdem poker round for a plurality of players and, concurrently with the primary Texas Holdem poker round, administering a secondary Texas Holdem poker round among at least some players who have folded out of the primary Texas Holdem poker round. These folded players retain their respective hole cards from the primary Texas Holdem poker round for the secondary Texas Holdem poker round, and the secondary Texas Holdem poker round utilizes at least one otherwise idle resource from the primary Texas Holdem poker round. For physical games played at a table with physical playing cards, the otherwise idle resource(s) comprises table positions of the folded players, and for computerized poker games played with virtual playing cards, the otherwise idle resource(s) comprise the remote communication connections between the dealer computer system and the player computer systems.

In one aspect, a method for enhancing resource utilization in Texas Holdem poker, comprises administering a primary Texas Holdem poker round by, for a plurality of players, providing a set of two hole cards for each player, wherein each set of two hole cards is associated with and visible by only a single player, receiving, from each player, a pre-primary-flop election, the pre-primary-flop election being one of a pre-primary-flop bet or a pre-primary-flop fold, providing a primary flop consisting of a set of three primary flop cards visible to at least all unfolded players, receiving, from each unfolded player, a post-primary-flop election, the post-primary-flop election being one of a post-primary-flop bet or a post-primary-flop fold, providing a primary turn card visible to at least all unfolded players, receiving, from each unfolded player, a primary turn card election, the primary turn card election being one of a primary turn card bet or a primary turn card fold, providing a primary river card visible to at least all unfolded players, and receiving, from each unfolded player, a primary river card election, the primary river card election being one of a primary river card bet or a primary river card fold. The method further comprises generating a secondary flop consisting of three secondary flop cards, and, concurrently with the primary Texas Holdem poker round, administering a secondary Texas Holdem poker round among at least a subset of folded players, wherein the at least a subset of folded players retain their respective hole cards from the primary Texas Holdem poker round for the secondary Texas Holdem poker round and the secondary Texas Holdem poker round utilizes the secondary flop, wherein the secondary Texas Holdem poker round utilizes at least one otherwise idle resource from the primary Texas Holdem poker round.

In a further aspect, a method for enhancing resource utilization in Texas Holdem poker, comprises administering a primary Texas Holdem poker round for a plurality of players and, concurrently with the primary Texas Holdem poker round, administering a secondary Texas Holdem poker round among at least a subset of folded players who have folded out of the primary Texas Holdem poker round, wherein the at least a subset of folded players retain their respective hole cards from the primary Texas Holdem poker round for the secondary Texas Holdem poker round and the secondary Texas Holdem poker round utilizes at least one otherwise idle resource from the primary Texas Holdem poker round.

In some embodiments, the primary Texas Holdem poker round and the secondary Texas Holdem poker round are both physical games played at a table with physical playing cards, and the at least one otherwise idle resource from the primary Texas Holdem poker round comprises table positions of folded players at the table.

In some embodiments, the primary Texas Holdem poker round and the secondary Texas Holdem poker round are both computerized poker games played with virtual playing cards by way of remote communication connections between a dealer computer system and player computer systems associated with the players, and the at least one otherwise idle resource from the primary Texas Holdem poker round comprises the remote communication connections between the dealer computer system and the player computer systems associated with at the least a subset of folded players.

In some embodiments, the secondary flop cards are drawn from unused cards, wherein the unused cards are cards other than the hole cards, the primary flop cards, the primary turn card and the primary river card.

In another aspect, a method for enhancing resource utilization in Texas Holdem poker comprises, in a computerized Texas Holdem poker game played with virtual playing cards by way of remote communication connection between a dealer computer system and a player computer system, at the player computer system, playing a primary Texas Holdem poker round by receiving, at the player computer system, a signal identifying a set of two hole cards, transmitting, from the player computer system, at least one election, each election being one of a bet or a fold, responsive to a fold, receiving, at the player computer system, a signal identifying a secondary flop consisting of three secondary flop cards, wherein the secondary flop cards are drawn from unused cards, wherein the unused cards are cards other than primary flop cards, a primary turn card and a primary river card from the primary Texas Holdem poker round, and, at the player computer system, while unfolded players concurrently play the primary Texas Holdem poker game, playing a secondary Texas Holdem poker game among at least a subset of other folded players, wherein the player computer system retains the hole cards from the primary Texas Holdem poker game for the secondary Texas Holdem poker game. The secondary Texas Holdem poker game utilizes the secondary flop and the secondary Texas Holdem poker game utilizes the remote communication connection between the dealer computer system and the player computer system.

BRIEF DESCRIPTION OF THE DRAWINGS

These and other features will become more apparent from the following description in which reference is made to the appended drawings wherein.

DETAILED DESCRIPTION

Aspects of the present technology can be implemented in two primary types of gaming environment: physical poker games played at a table with physical playing cards; and computerized poker games played with virtual playing cards by way of remote communication connections between a dealer computer system and player computer systems associated with the players.

In order to simplify the description, the broad term “bet” will be used to encompass both an additional wager and also a “check” (i.e. where a player remains in the game without an additional wager). A check may be seen, in one sense, as a wager of zero. Thus, the term “bet”, as used herein, includes a check.

Figure 1:
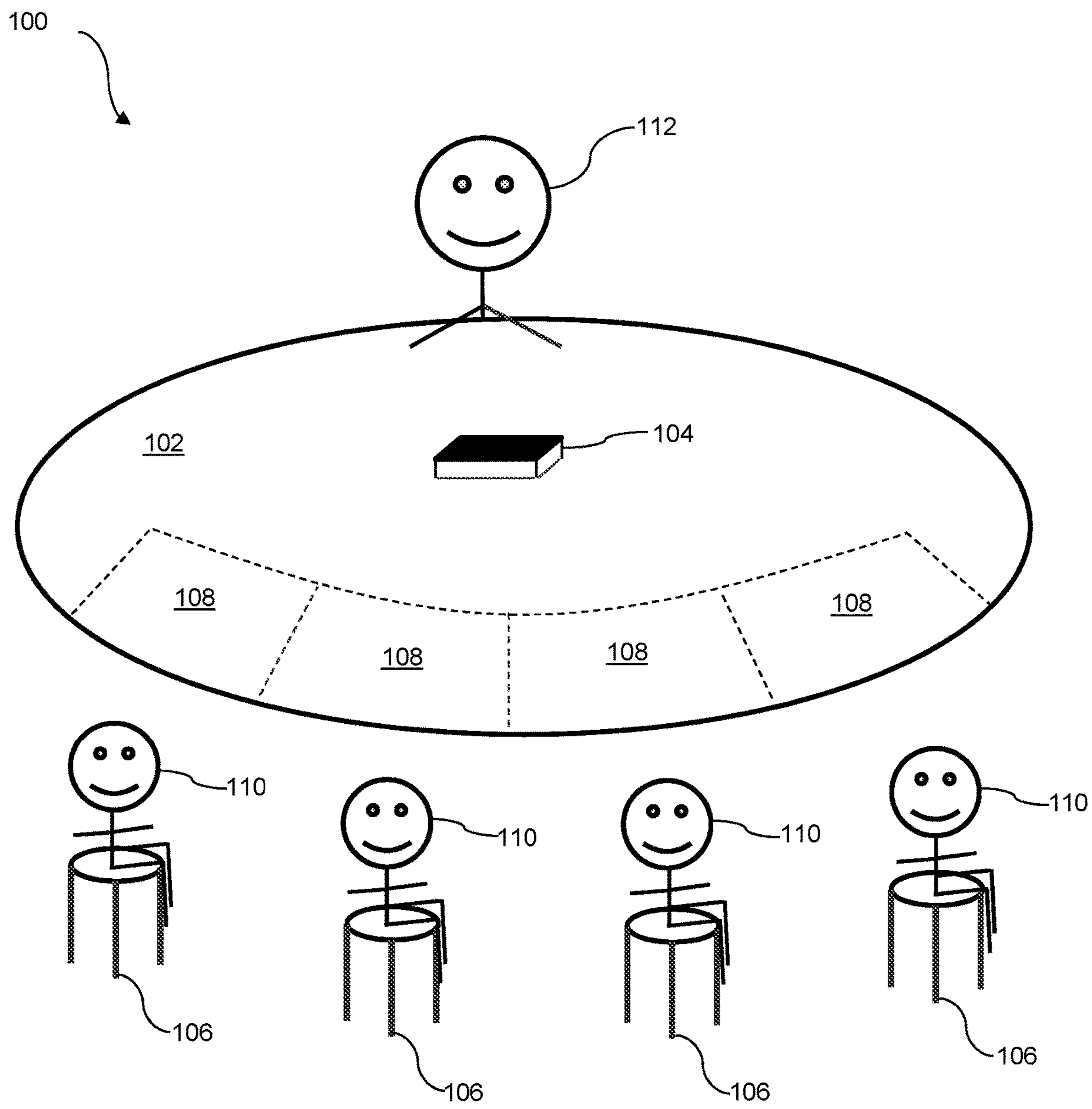
FIG. 1 shows an exemplary physical poker gaming environment.

FIG. 1 shows an exemplary physical poker gaming environment, indicated generally at reference 100. The physical poker gaming environment 100 comprises a poker table 102, a plurality of physical playing cards 104, and a plurality of seats 106 (e.g. chairs, stools, or the like). Each of the seats 106 is associated with a particular table position 108 at the poker table 102; alternately players may stand at or lean on the poker table 102 at their respective table position 108). The physical size and configuration of the poker table 102 constrains the number of table positions 108, since the players 110 must be comfortably spaced apart from one another. In some configurations all of the players 110 may be on one side of the poker table 102 facing a dealer 112, as shown in FIG. 1. In other configurations the players may be positioned about a larger part of the periphery, or around the entire periphery, of the poker table; in such embodiments one of the players may function as the dealer.

The physical poker gaming environment 100 described above is merely exemplary, and other embodiments are also contemplated.

Typically, the same group of players will play several rounds of Texas Holdem poker together. When one or more of the players 110 fold, they will typically continue to sit (or stand) at their respective table position 108, even though they are no longer playing, while waiting for the next round to begin. Thus, in conventional Texas Holdem poker, the table positions 108 of the folded players represent an idle resource.

Figure 2:
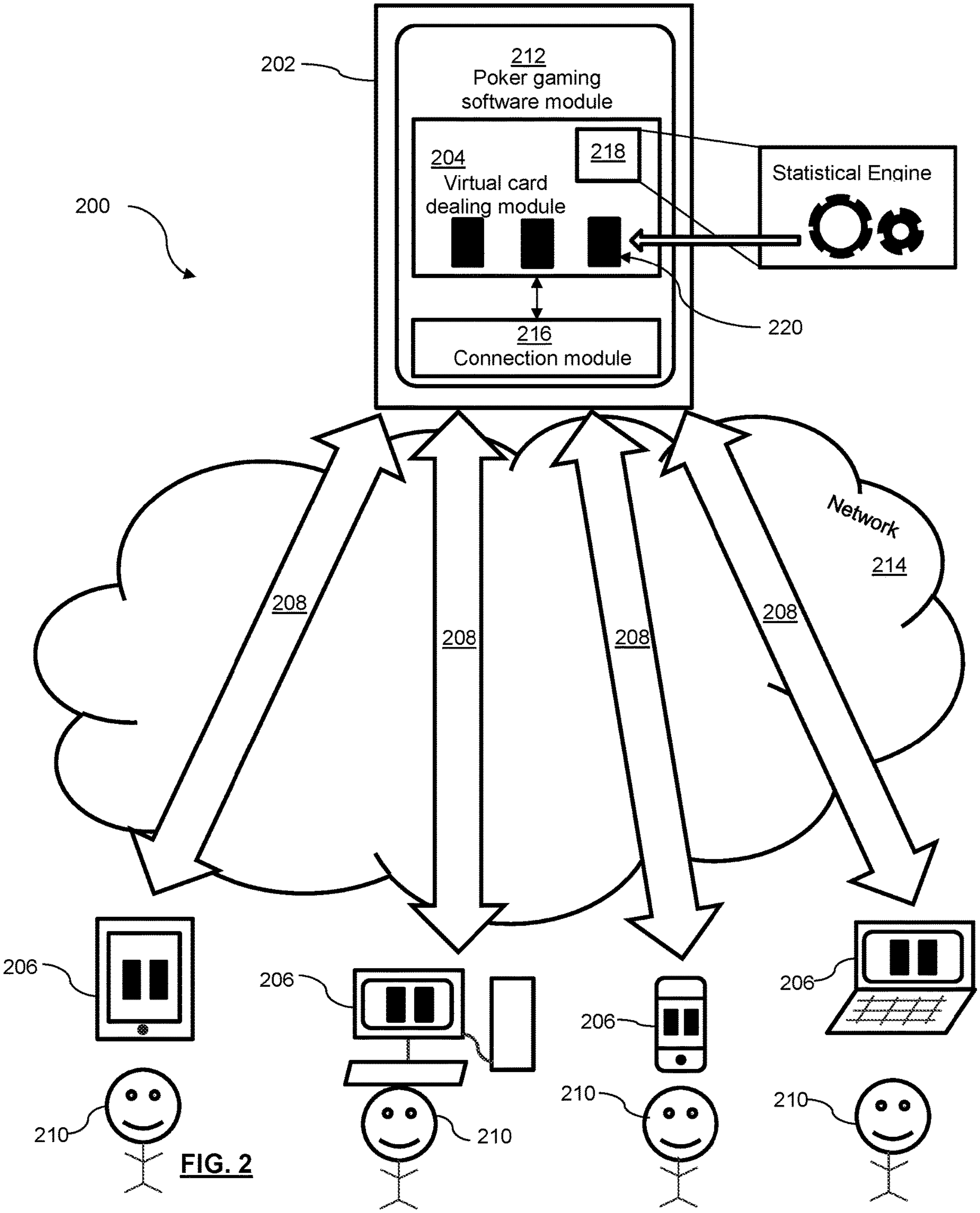
FIG. 2 shows an exemplary computerized poker gaming environment.

Reference is now made to FIG. 2, which shows an exemplary computerized poker gaming environment, indicated generally by reference 200. The exemplary computerized poker gaming environment 200 comprises at least one dealer computer system 202 coupled to a plurality of player computer systems 206 via respective remote communications connections 208 over a network 214. In the illustrated embodiments, the remote communications connections 208 are made via the Internet although other networks (e.g. a private local area network (LAN) or private wide area network (WAN) may also be used); virtual private networks may also be used. Each of the player computer systems 206 is associated with a particular player 210. The player computer systems 206 may be any device capable of executing the required software, such as (for example and without limitation) a desktop computer, laptop computer, tablet computer, smartphone or a watch computer, or a video game system. In some embodiments, some or all of the player computer systems may be purpose-built online gaming terminals (e.g. video poker terminals), some or all of which may be located in a single facility (e.g. a casino) or which may be geographically dispersed (e.g. at bars, restaurants, etc.).

The dealer computer system 202, typically but not necessarily comprising one or more server computers, executes a poker gaming software module 212 that includes a virtual card dealing module 204 and a connection module 216 for establishing and maintaining the remote communications connections 208 with the player computer systems 206. The poker gaming software module 212 may be implemented as the back end of a web page, such that the remote communications connections 208 are established by conventional web browsers (e.g. Microsoft Internet Explorer/Microsoft Edge, Google Chrome, Apple Safari) on the player computer systems 206. Alternatively, the poker gaming software module 212 may be implemented as a specialized software application that interfaces with a corresponding specialized software application on the player computer systems 206. The virtual card dealing module 204 includes a suitable statistical engine 218 adapted to simulate the drawing of physical playing cards from a randomly shuffled deck and thereby provide virtual cards 220. Implementation of various types of virtual card dealing modules is within the capability of those skilled in the art and therefore is not described further.

The poker gaming software module 212 acts as a "virtual dealer", and communicates virtual cards 220 from the virtual card dealing module 204 to the player computer systems 206 via the remote communications connections 208. The player computer systems 206 then expose the appropriate virtual cards 220 to the respective players 210, typically by way of a graphical user interface (GUI). The poker gaming software module 212 also tracks which virtual cards 220 are associated with each player computer system 206. Analogously to a physical game of Texas Holdem poker, the player computer systems 206 will, at the appropriate times, expose the hole cards for the respective player 210, the flop cards, turn card and river card, but will not expose the hole cards for the other players 210 until the round is concluded (and in some contexts may never expose the hole cards for the other players 210). The players 210 can enter their bets, or fold, using the respective player computer systems 206, which communicate this information via the remote communications connections 208 to the poker gaming software module 212 on the dealer computer system 202, which tracks the information and administers the game. Although FIG. 2 shows the dealer computer system 202 administering a single game among a group of players 210 for ease of illustration, it will be appreciated that a suitably configured dealer computer system may administer dozens, hundreds or even thousands of games among individual groups of players.

The above-described computerized poker gaming environment 200 is merely one exemplary implementation of such an environment and is not intended to be limiting or to exclude alternate implementations that fall within the scope of the claims. For example, other types and arrangements of modules within the dealer computer system are also contemplated.

Analogously to the physical context, in the computerized poker gaming environment 200, the same group of players 210 may play several rounds of Texas Holdem poker together. As such, when a player 210 in the computerized poker gaming environment 200 folds, he or she may maintain the remote communications connection 208 to the poker gaming software module 212 on the dealer computer system 202 while waiting for the next round to begin. These remote communication connections 208 associated with the folded players represent an idle resource.

Thus, as described above, in conventional Texas Holdem poker in a physical environment, the table positions 108 of the folded players represent an idle resource and similarly, in conventional Texas Holdem poker in a computerized poker gaming environment, the remote communication connections 208 associated with the folded players represent an idle resource. Exemplary methods for better utilizing these resources will now be described.

Broadly speaking, the exemplary methods utilize a secondary Texas Holdem poker round which is played by players who have folded out of the primary Texas Holdem poker round.

Figure 3:
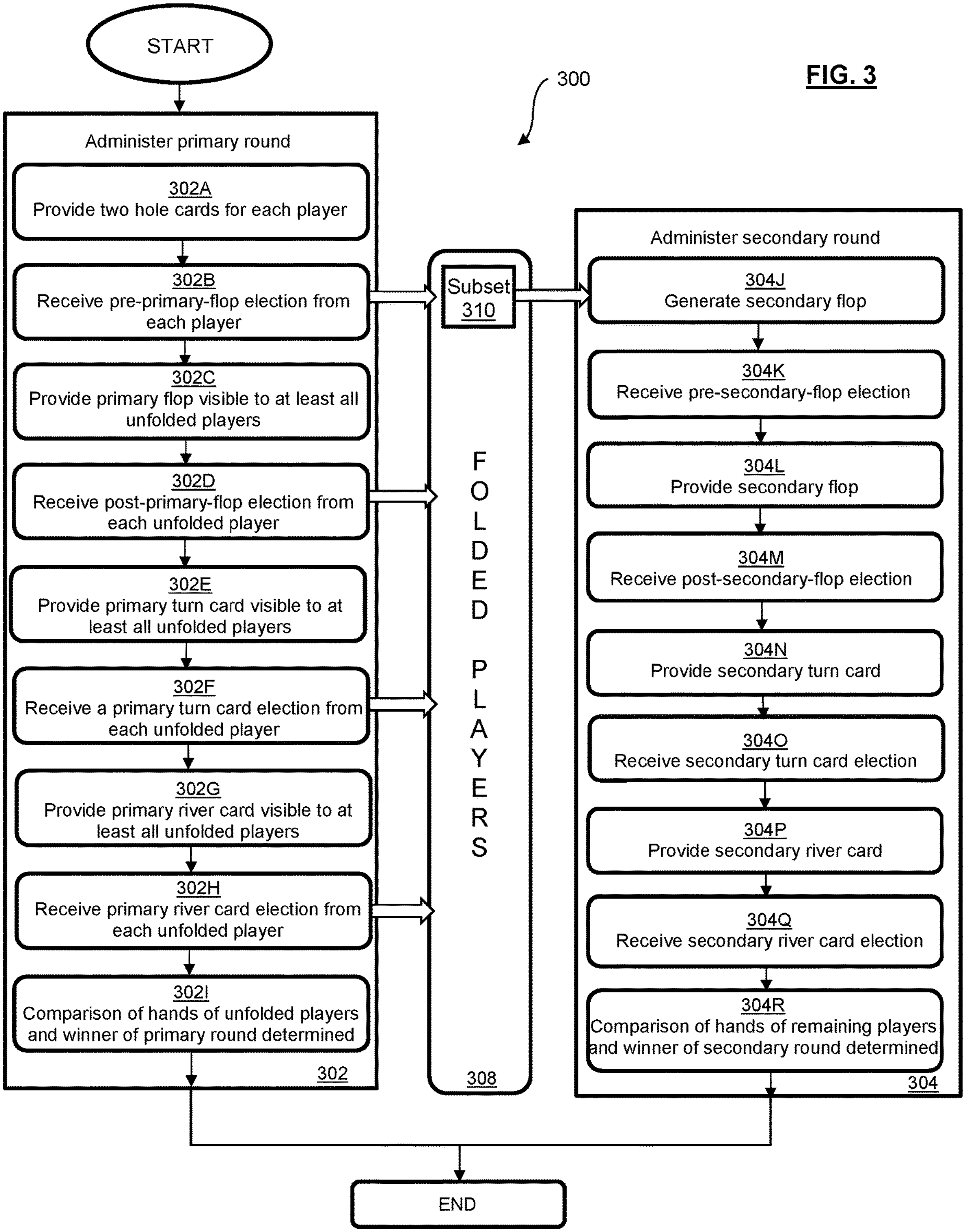
FIG. 3 is a flow chart showing an exemplary method for enhancing resource utilization in Texas Holdem poker.

Reference is now made to FIG. 3, in which an exemplary method for enhancing resource utilization in Texas Holdem poker is indicated generally at 300. The method 300 may be applied to Texas Holdem poker in a physical poker gaming environment, as shown in FIGS. 4A to 4I, and also to Texas Holdem poker in a computerized poker gaming environment, as shown in FIGS. 5A to 5I.

The method 300 comprises two primary steps, each of which comprises a plurality of sub-steps. More particularly, the method 300 comprises a step 302 of administering a primary Texas Holdem poker round for a plurality of players and a step 304 of, concurrently with the primary Texas Holdem poker round, administering a secondary Texas Holdem poker round among at least a subset of folded players. As used in this context, the term "folded players" refers to players who have folded out of the primary Texas Holdem round (step 302); such players may be active in, that is, not folded out of, the secondary Texas Holdem poker round (step 304). Since players may fold out of the primary Texas Holdem round (step 302) at various stages of gameplay, it will be appreciated that the term "concurrently with the primary Texas Holdem poker round" requires only a partial temporal overlap therewith. Thus, the primary Texas Holdem poker round may end before or after the secondary Texas Holdem poker round and, as long as there is some period of time during which both the primary Texas Holdem poker round and the secondary Texas Holdem poker round are being played simultaneously, the Texas Holdem poker rounds are being played concurrently.

Continuing to refer to FIG. 3, and also to FIGS. 4A to 4I and 5A to 5I in sequence, the method 300 will now be described in more detail with respect to step 302, that is, administering a primary Texas Holdem poker round for a plurality of players. Step 302 comprises sub-steps 302A through 302I.

Figure 4A:
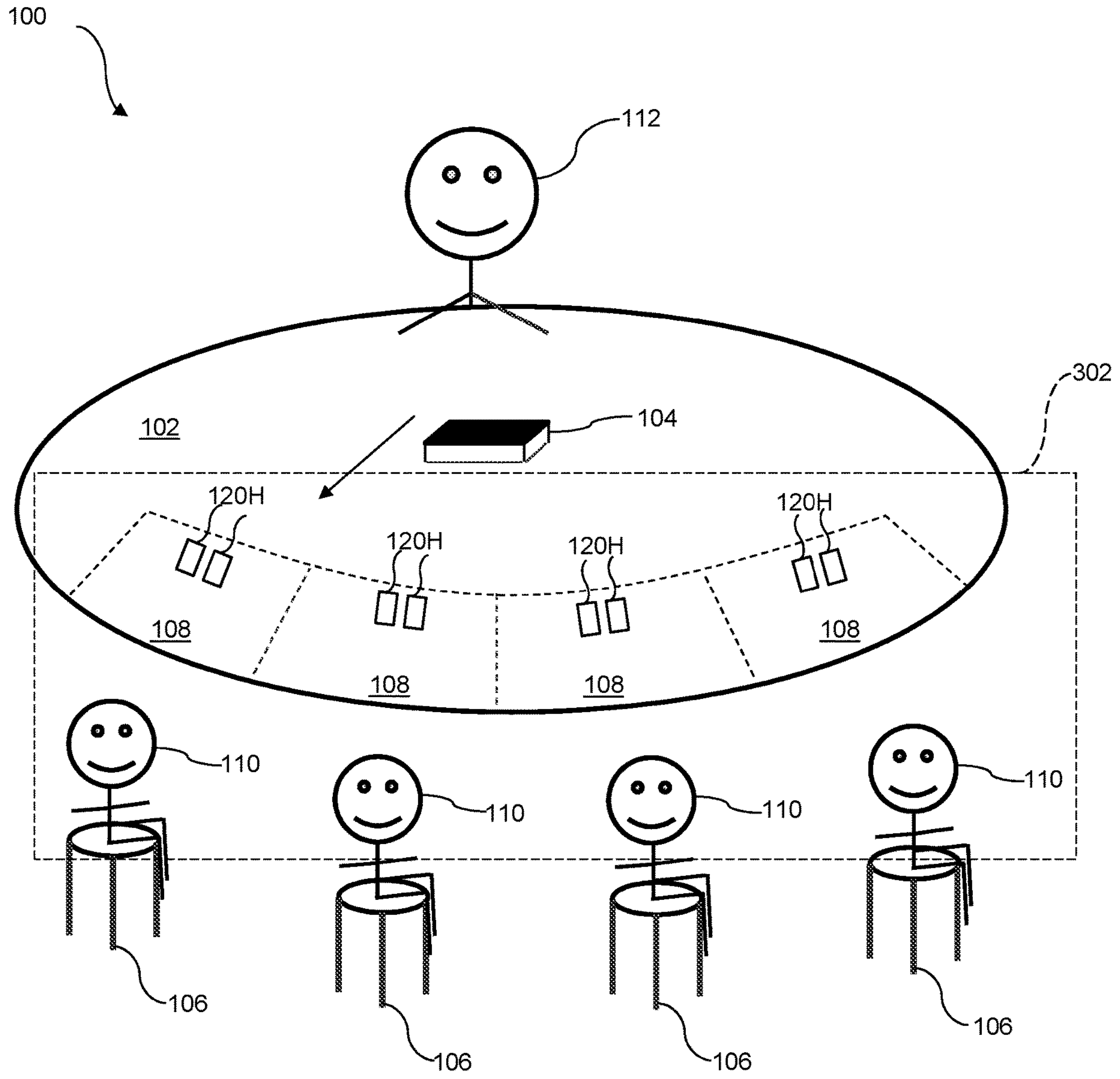
FIGS. 4A to 4I show exemplary implementation, in the physical poker gaming environment of FIG. 1, of the method for enhancing resource utilization in Texas Holdem poker shown in FIG. 3.
Figure 5A:
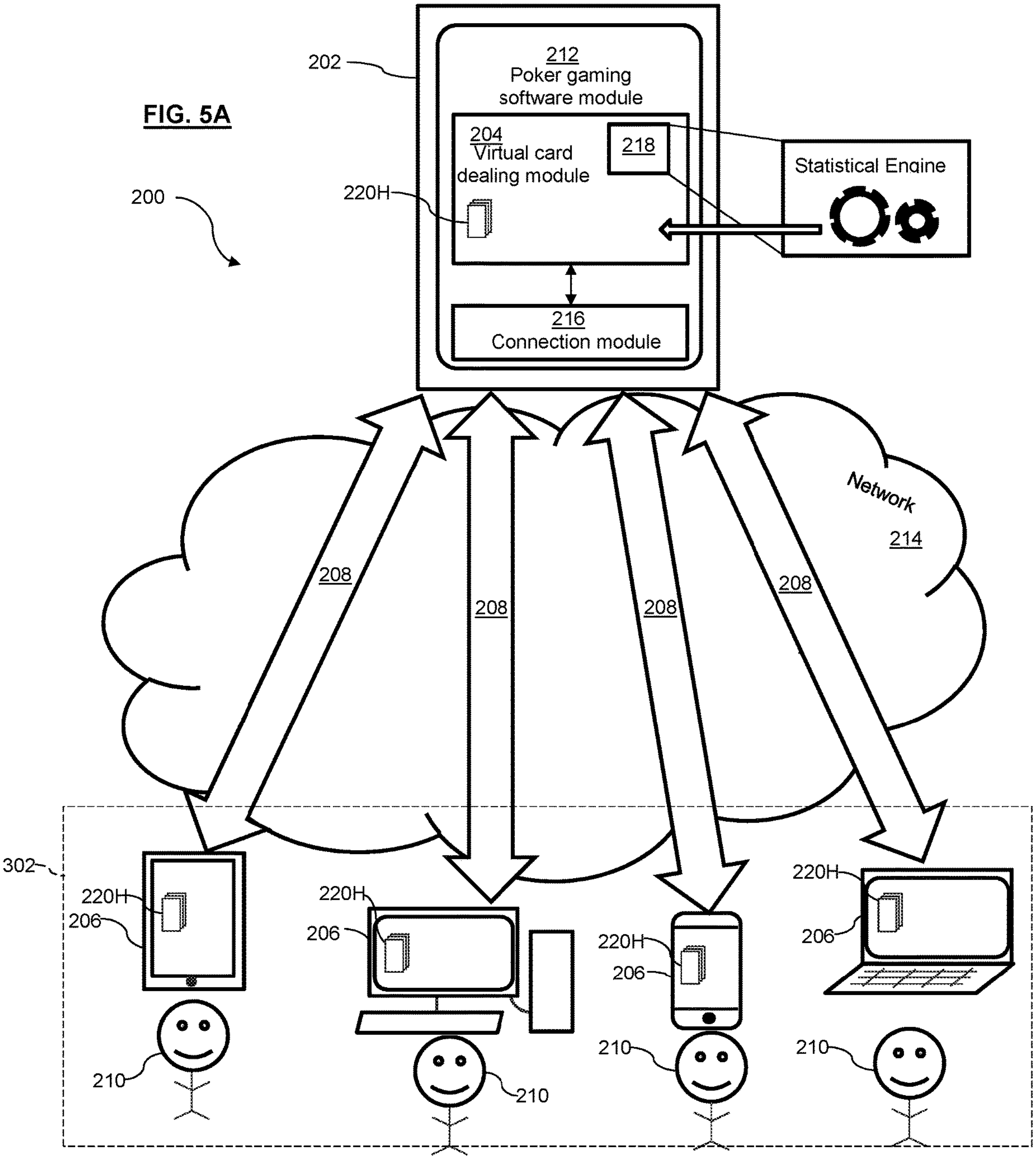
FIGS. 5A to 5I show exemplary implementation, in the computerized poker gaming environment of FIG. 2, of the method for enhancing resource utilization in Texas Holdem poker shown in FIG. 3.

At sub-step 302A, the method 300 provides a set of two hole cards for each player. Each set of two hole cards is associated with and visible by only a single player. In a physical poker gaming environment, as shown in FIG. 4A, an exemplary implementation of sub-step 302A comprises the dealer 112 dealing two physical cards 120H from the deck 104 to each player 110, face down (i.e. the cards 120H are dealt face down; despite possibly having had a few drinks, the players 110 hopefully remain conscious). In a computerized poker gaming environment, as shown in FIG. 5A, an exemplary implementation of sub-step 302A comprises the poker gaming software module 212 communicating two virtual cards 220H from the virtual card dealing module 204 to each of the respective player computer systems 206 via the remote communications connections 208.

Figure 4B:
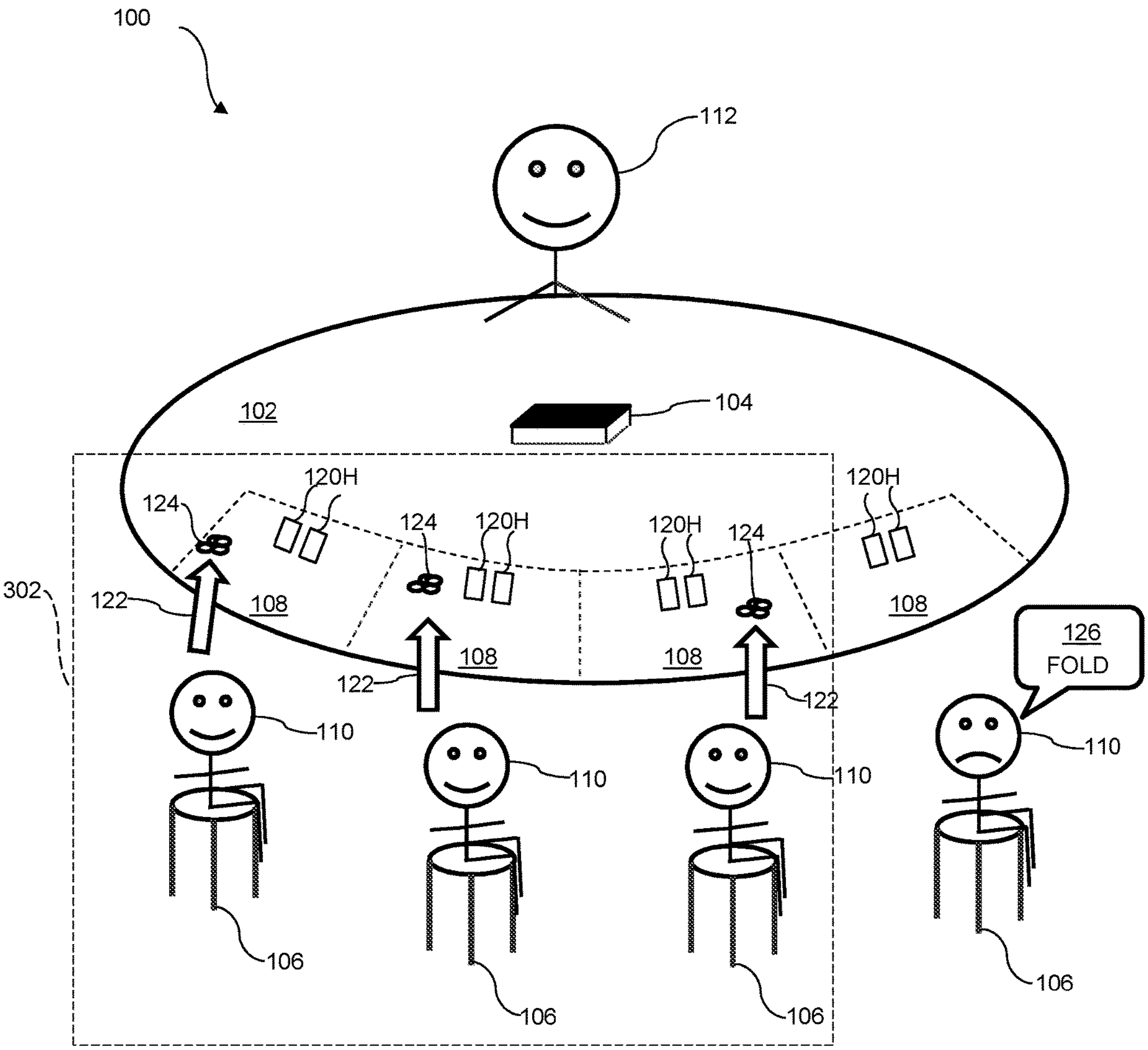
Figure 5B:
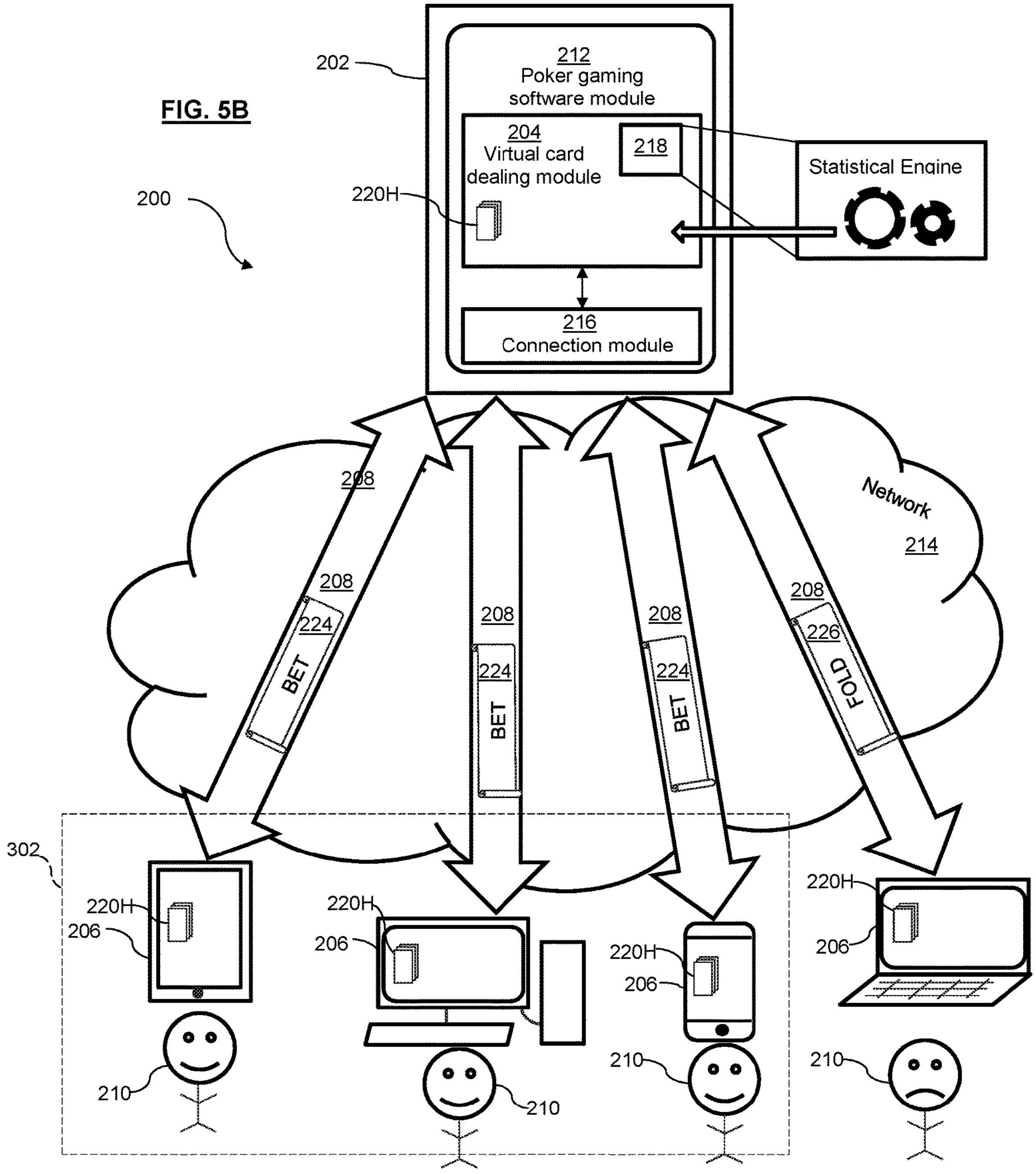

At sub-step 302B, the method 300 receives, from each player, a pre-primary-flop election. The pre-primary-flop election is either a pre-primary-flop bet or a pre-primary-flop fold (i.e. the player folds out of the primary Texas Holdem round (step 302). In a physical poker gaming environment, as shown in FIG. 4B, an exemplary implementation of sub-step 302B comprises the players 110 indicating a pre-primary-flop bet by, for example, placing 122 chips 124 or other indicia of value on the table 102 or indicating a pre-primary-flop fold by, for example, verbally notifying 126 the dealer 112 and the other players 110 or otherwise declaring a fold. In a computerized poker gaming environment, as shown in FIG. 5B, an exemplary implementation of sub-step 302B comprises the players 210 using their respective player computer systems 206 to communicate either the value of a pre-primary-flop bet 224, or the fact of a pre-primary-flop fold 226, to the poker gaming software module 212 via the remote communications connections 208.

After sub-step 302B is complete, there will be a set 308 of folded players (FIG. 3), that is, players who have folded out of the primary Texas Holdem round (step 302), and who may proceed to the secondary Texas Holdem round (step 304) as described further below. Note that the set 308 of folded players may consist of a plurality of players, a single player, or no players (i.e. an empty set) depending on how many players, if any, have indicated a pre-primary flop fold at step 302B.

Figure 4C:
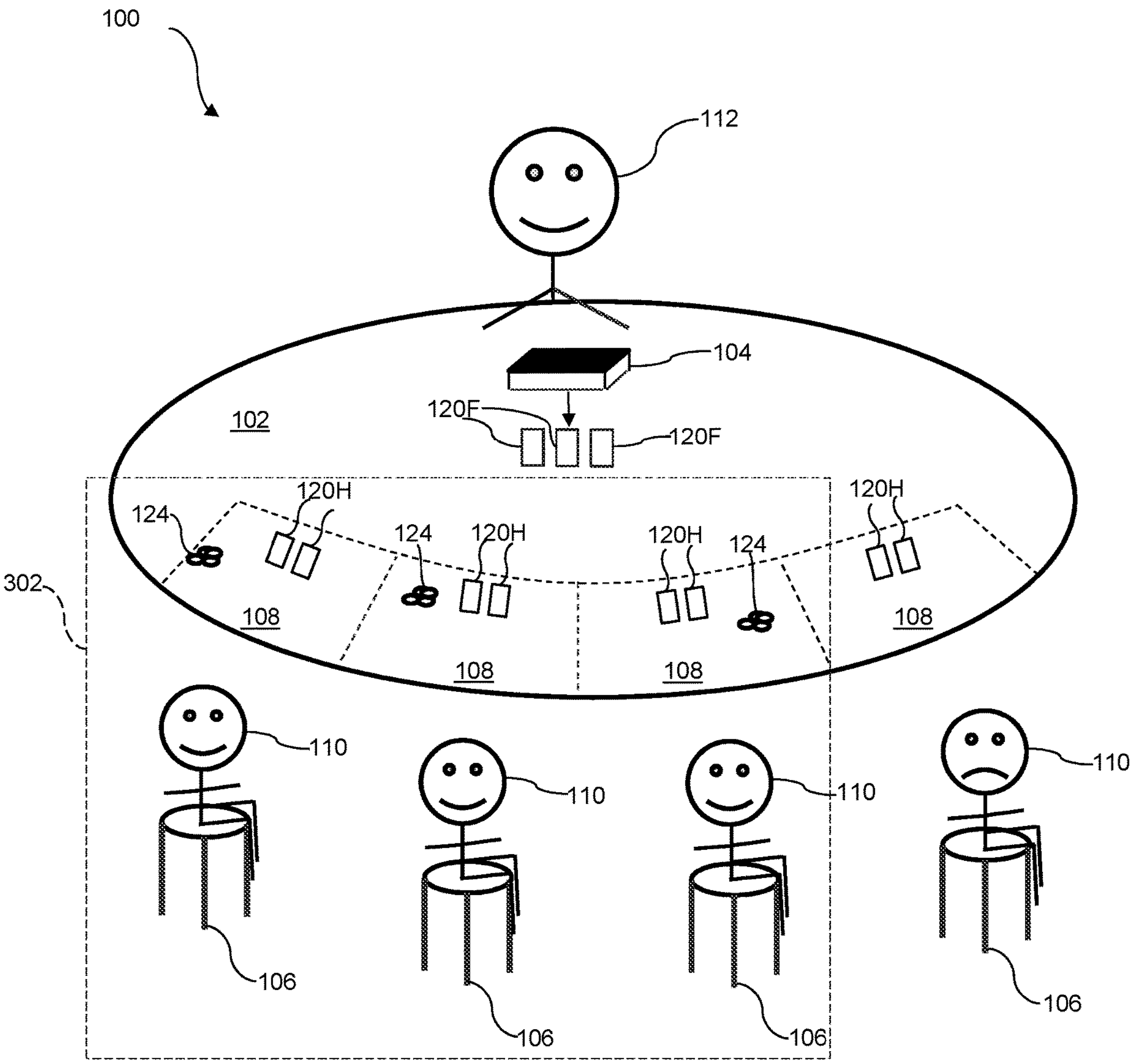
Figure 5C:
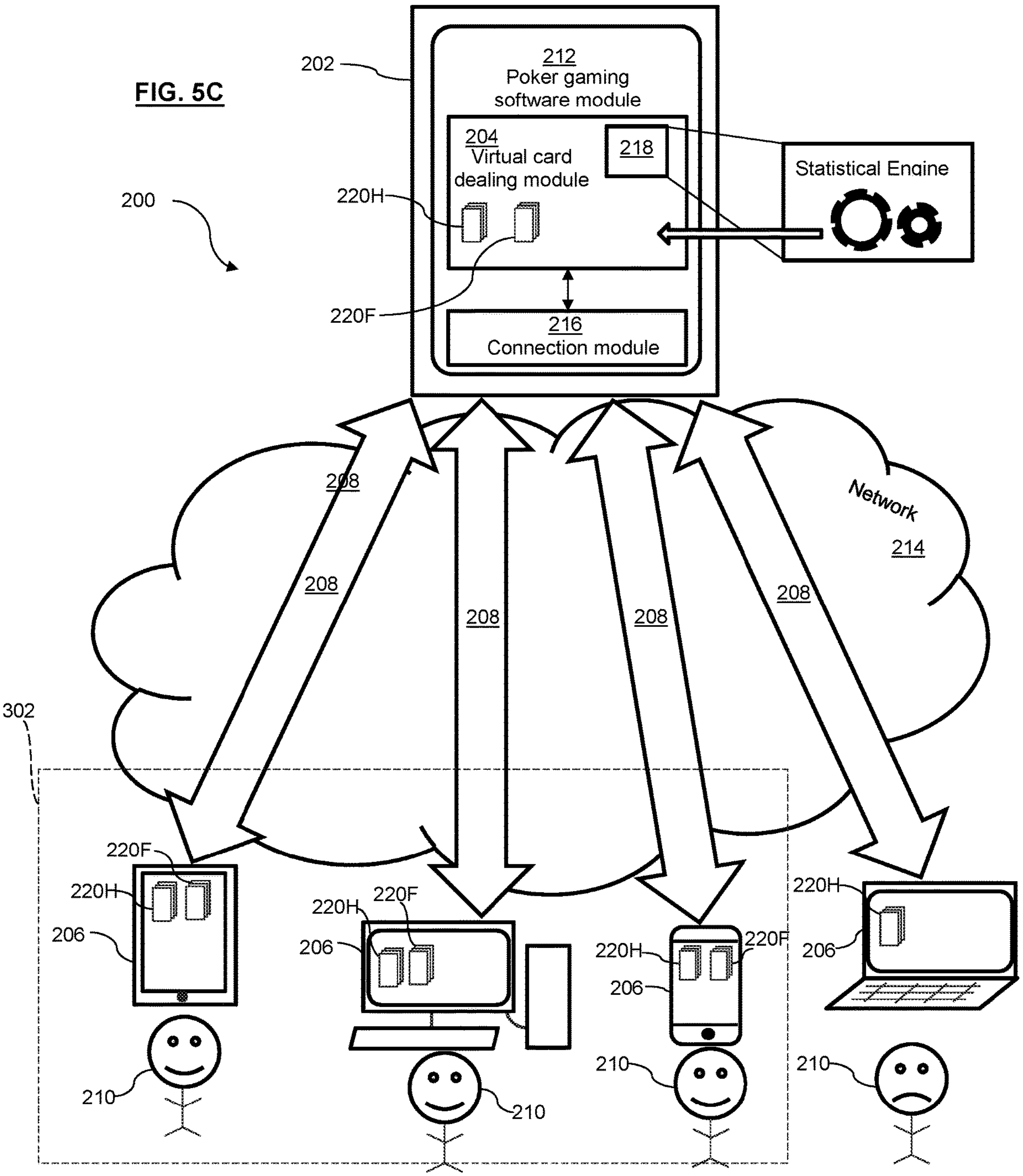

At sub-step 302C, the method 300 provides a primary flop consisting of a set of three primary flop cards visible to at least all unfolded players, that is, players who have not indicated a pre-primary flop fold at step 302B. In a physical poker gaming environment, as shown in FIG. 4C, an exemplary implementation of sub-step 302C comprises the dealer 112 dealing three physical cards 120F from the deck 104 face up onto the table 102 so as to be visible to all unfolded players 110. Optionally, a burn card may be drawn before drawing the three cards 120F that make up the flop. In a computerized poker gaming environment, as shown in FIG. 5C, an exemplary implementation of sub-step 302C comprises the poker gaming software module 212 communicating the same three virtual cards 220F from the virtual card dealing module 204 to the player computer systems 206 of the unfolded players 210 via the remote communications connections 208.

Figure 4D:
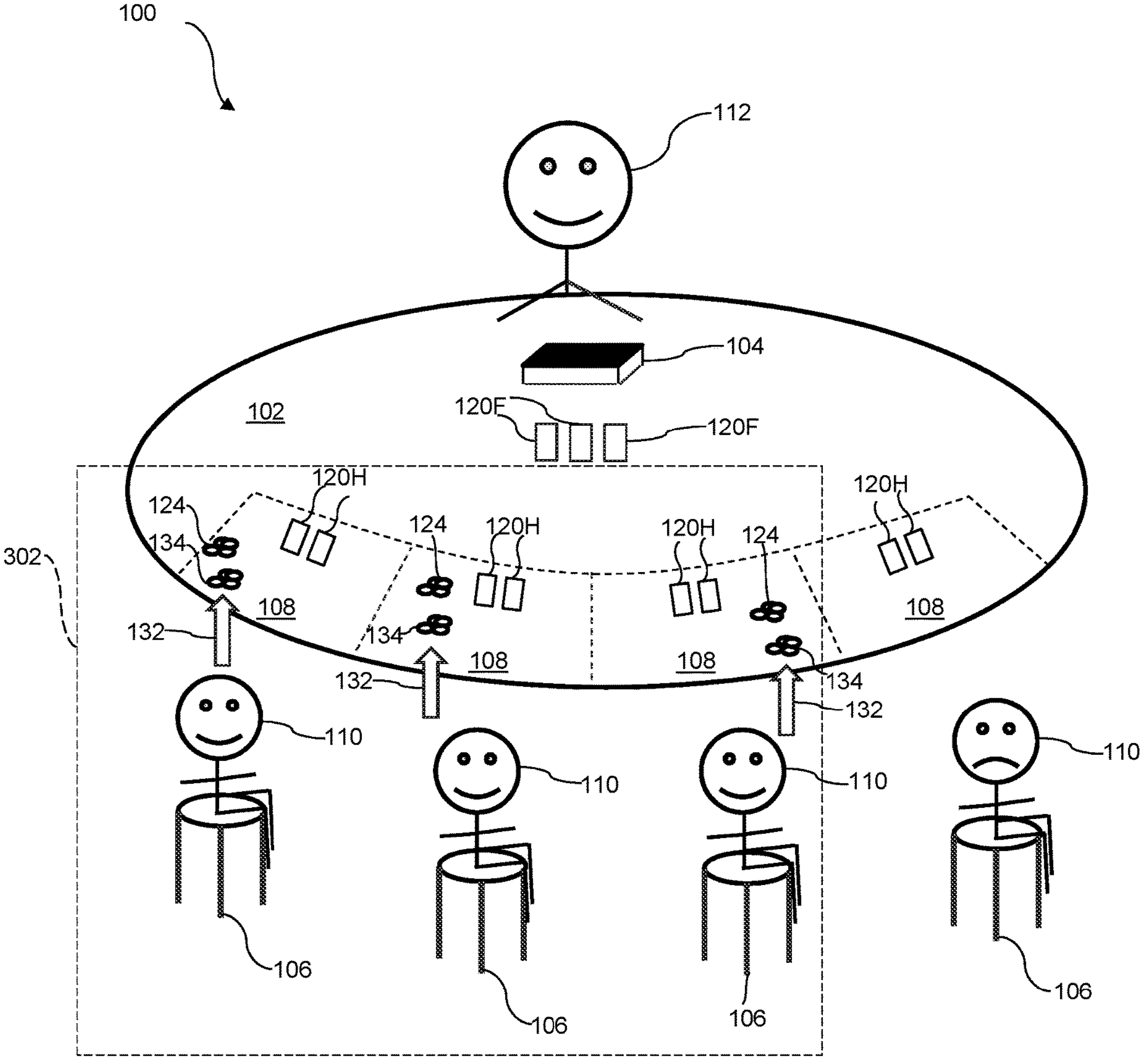
Figure 5D:
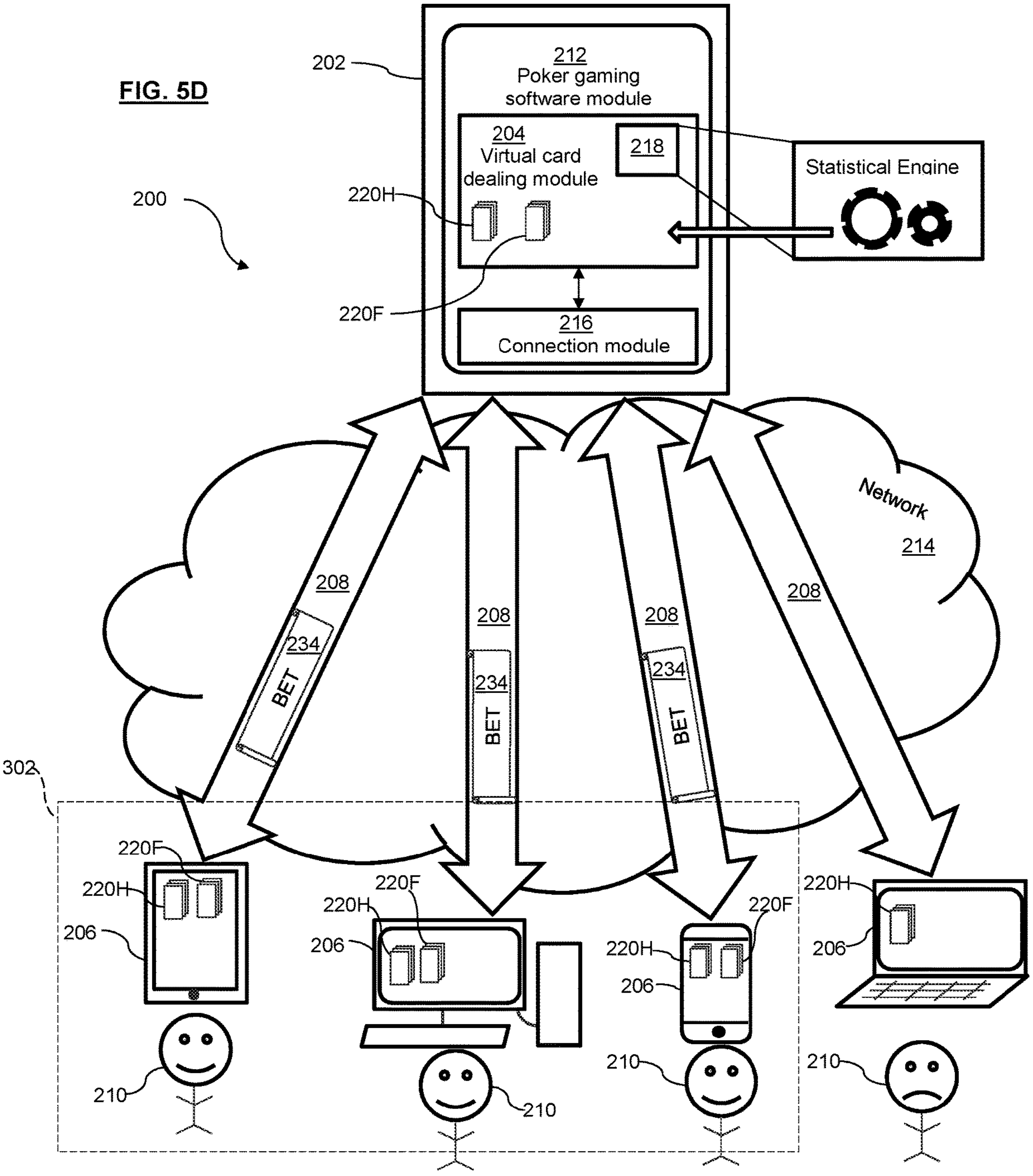

At sub-step 302D, the method 300 receives, from each unfolded player, a post-primary-flop election. The post-primary-flop election is either a post-primary-flop bet or a post-primary-flop fold (i.e. the player folds out of the primary Texas Holdem round (step 302)). In a physical poker gaming environment, as shown in FIG. 4D, an exemplary implementation of sub-step 302D comprises the remaining unfolded players 110 indicating a post-primary-flop bet by, for example, placing 132 chips 134 or other indicia of value on the table 102 or indicating a post-primary-flop fold by, for example, verbally notifying the dealer 112 and the other players 110 (in FIG. 4D no players 110 fold at step 302D). In a computerized poker gaming environment, as shown in FIG. 5D, an exemplary implementation of sub-step 302D comprises the players 210 using their respective player computer systems 206 to communicate either the value of a post-primary-flop bet 234, or the fact of a post-primary-flop fold, to the poker gaming software module 212 via the remote communications connections 208 (in FIG. 5D no players 210 fold at step 302D). The post-primary flop election may also be referred to as a pre-primary turn card election since the election is made before the turn card in the primary Texas Holdem round (step 302) is revealed at sub-step 302E.

After sub-step 302D is complete, there may be additional members of the set 308 of folded players, namely any players who have folded out of the primary Texas Holdem round (step 302) at sub-step 302D, and who may proceed to the secondary Texas Holdem round (step 304) as described further below. Again, the set 308 of folded players may consist of a plurality of players, a single player, or no players (i.e. an empty set) depending on how many players, if any, have indicated a pre-primary flop fold at sub-step 302B or a post-primary flop fold at sub-step 302D.

Figure 4E:
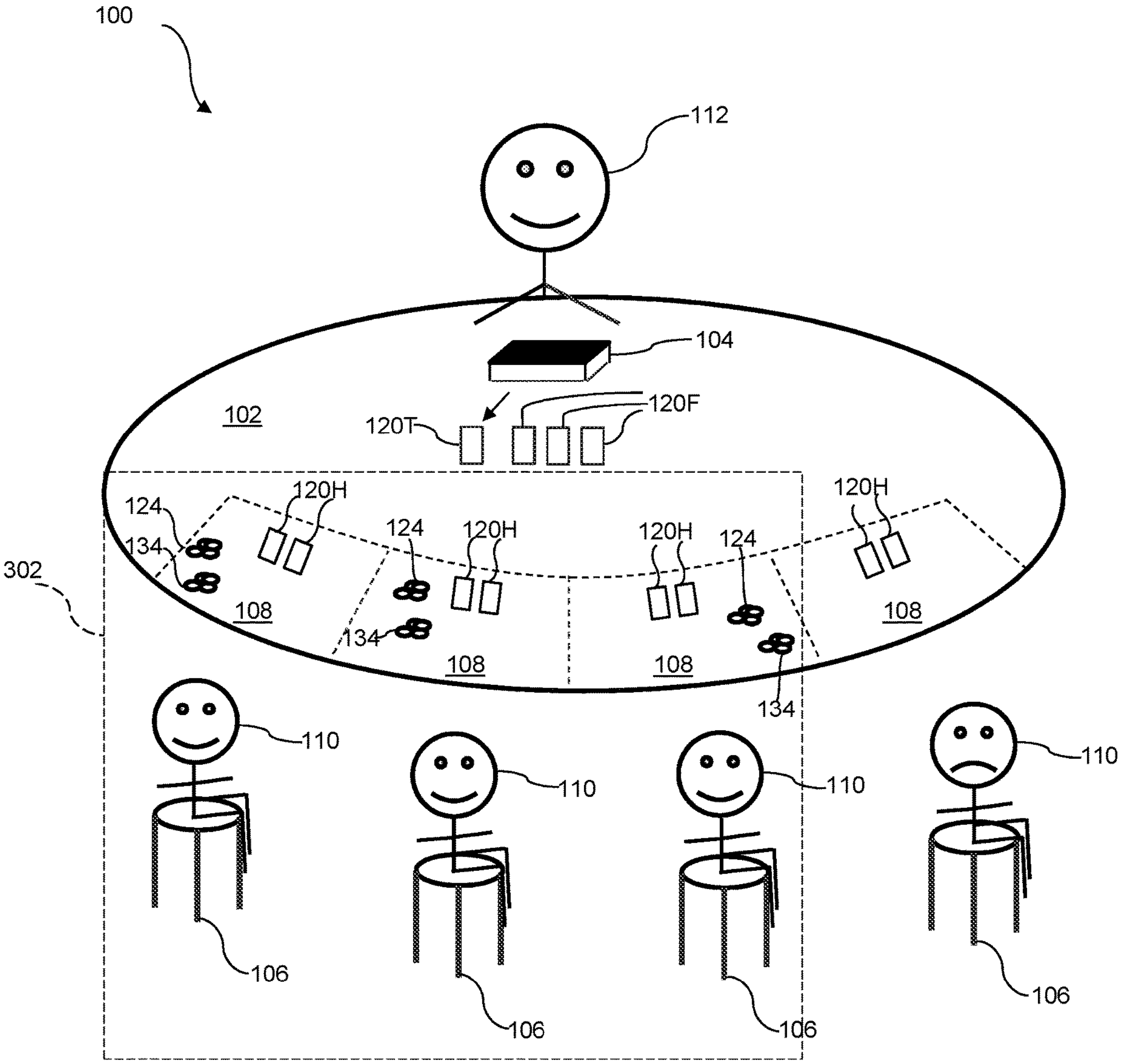
Figure 5E:
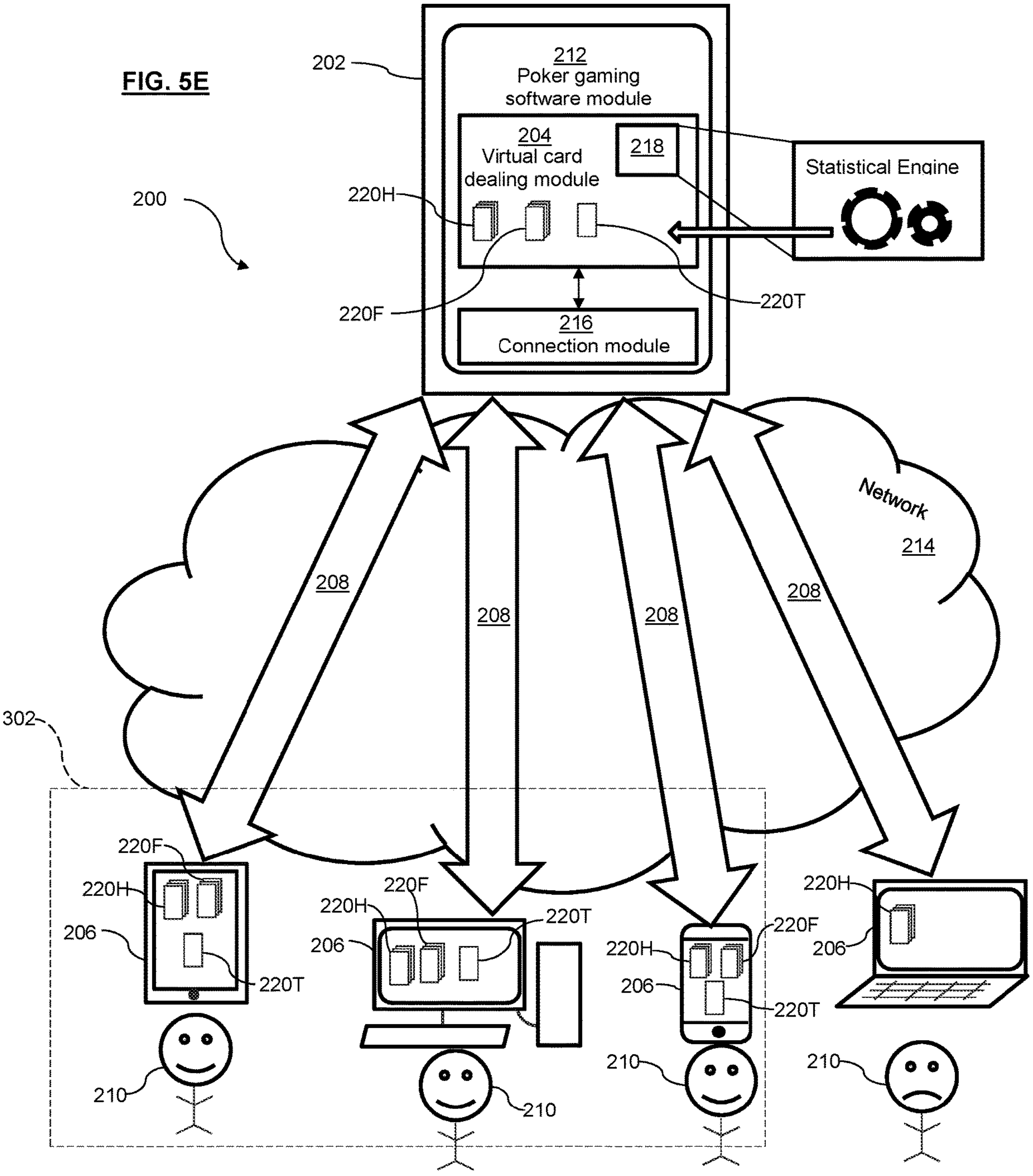

At sub-step 302E, the method 300 provides a primary turn card visible to at least all unfolded players. In a physical poker gaming environment, as shown in FIG. 4E, an exemplary implementation of step 302E comprises the dealer 112 dealing another physical card 120T from the deck 104 face up onto the table 102 so as to be visible to all unfolded players 110. Optionally, a burn card may be drawn before drawing the turn card 120T. In a computerized poker gaming environment, as shown in FIG. 5E, an exemplary implementation of step 302E comprises the poker gaming software module 212 communicating a virtual card 220T from the virtual card dealing module 204 to the player computer systems 206 of the unfolded players 210 via the remote communications connections 208.

Figure 4F:
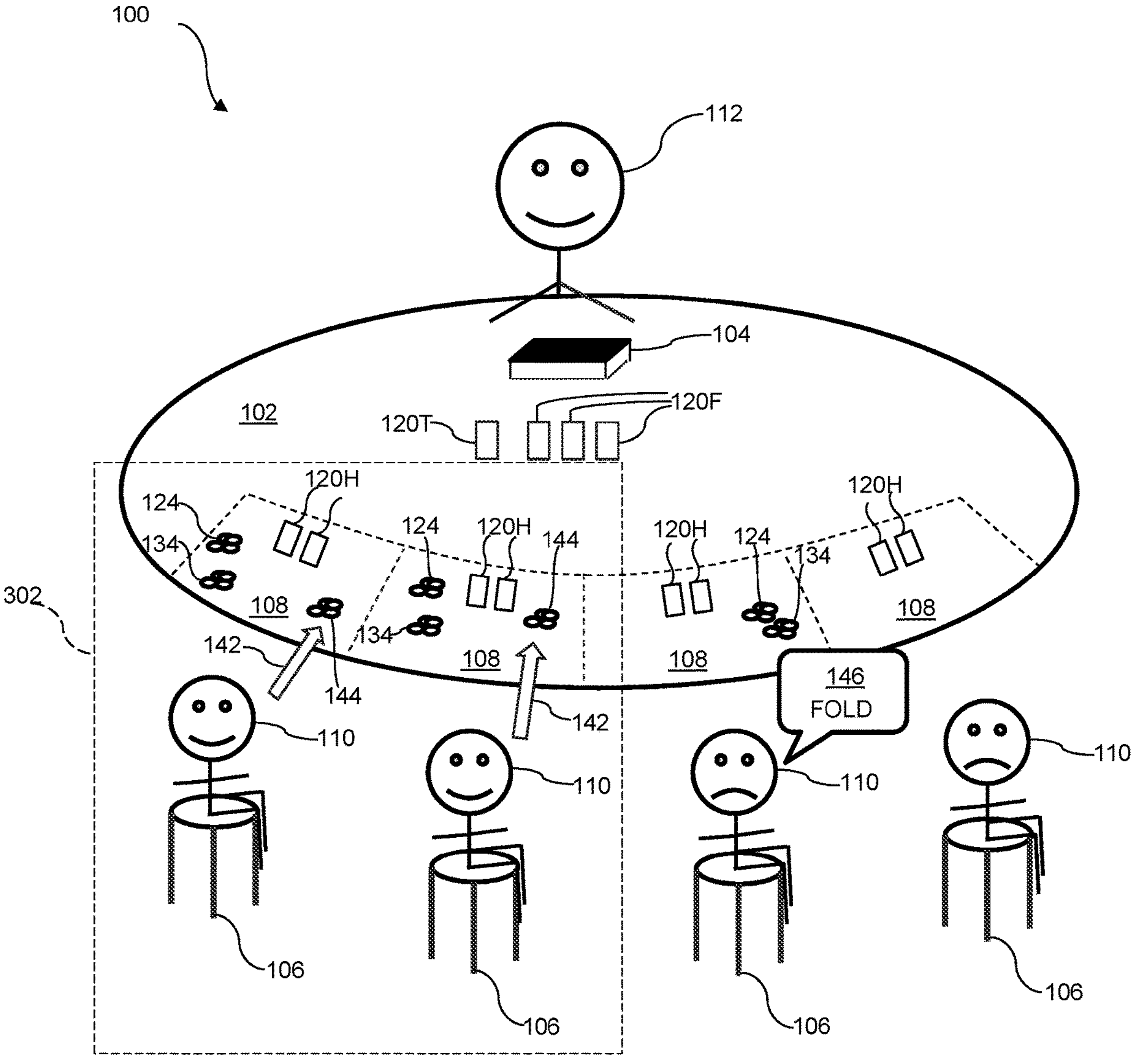
Figure 5F:
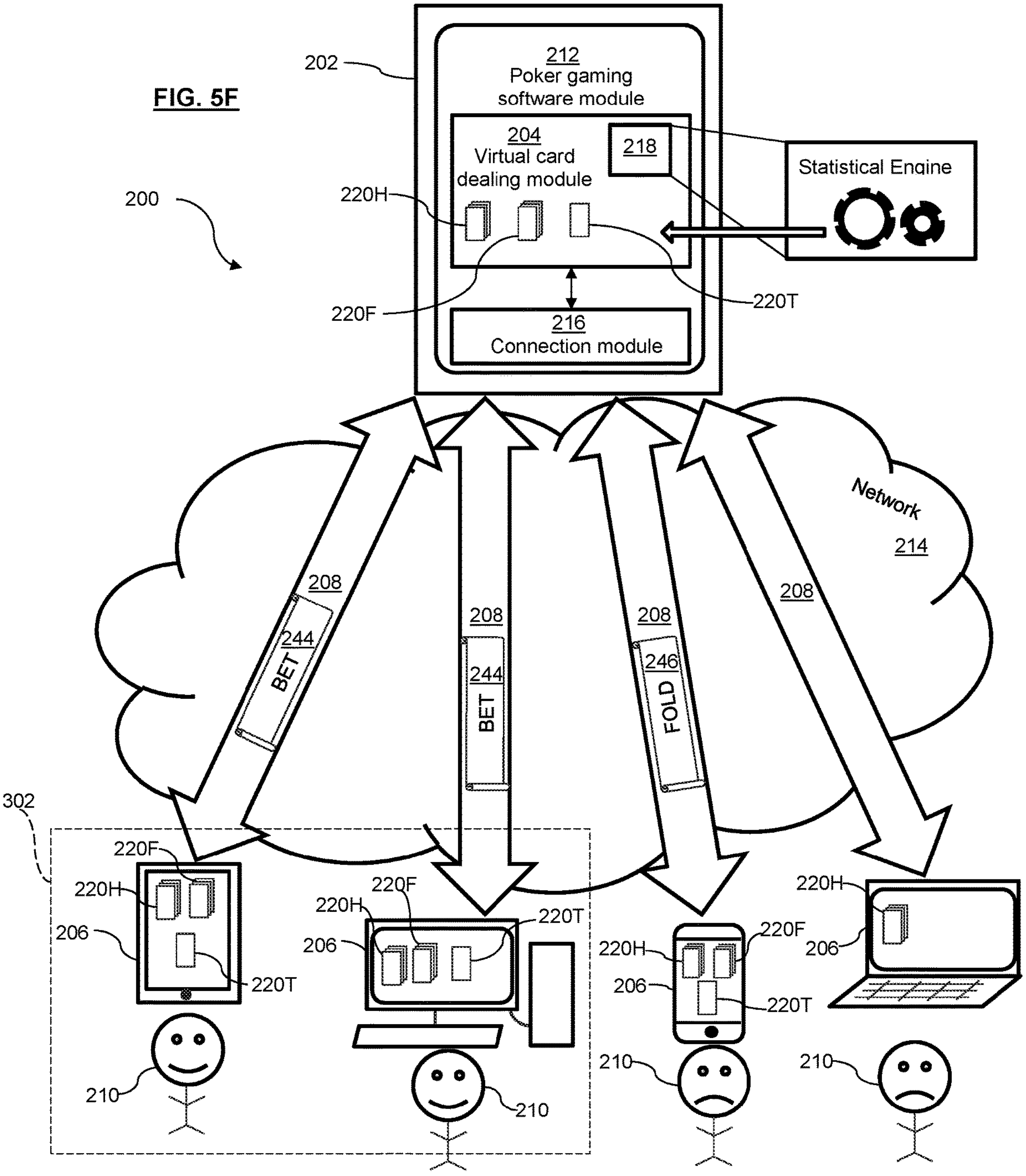

At sub-step 302F, the method 300 receives, from each unfolded player, a primary turn card election. The primary turn card election is either of a primary turn card bet or a primary turn card fold. In a physical poker gaming environment, as shown in FIG. 4F, an exemplary implementation of sub-step 302F comprises the remaining unfolded players 110 indicating a primary turn card bet by, for example, placing 142 chips 144 or other indicia of value on the table 102 or indicating a primary turn card fold by, for example, verbally notifying 146 the dealer 112 and the other players 110. In a computerized poker gaming environment, as shown in FIG. 5F, an exemplary implementation of step 302F comprises the players 210 using their respective player computer systems 206 to communicate either the value of a primary turn card bet 244, or the fact of a primary turn card fold 246, to the poker gaming software module 212 via the remote communications connections 208.

Following sub-step 302F, there may be further members of the set 308 of folded players, since any players who have folded out of the primary Texas Holdem round (step 302) at sub-step 302F are added to the set 308 of folded players. As noted previously, the set 308 of folded players may consist of a plurality of players, a single player, or no players (i.e. an empty set) depending on how many players, if any, have indicated a pre-primary flop fold at sub-step 302B, a post-primary flop fold at sub-step 302D and/or primary turn card fold at sub-step 302F. Some or all members of the set 308 of folded players may proceed to the secondary Texas Holdem round (step 304) as described further below.

Figure 4G:
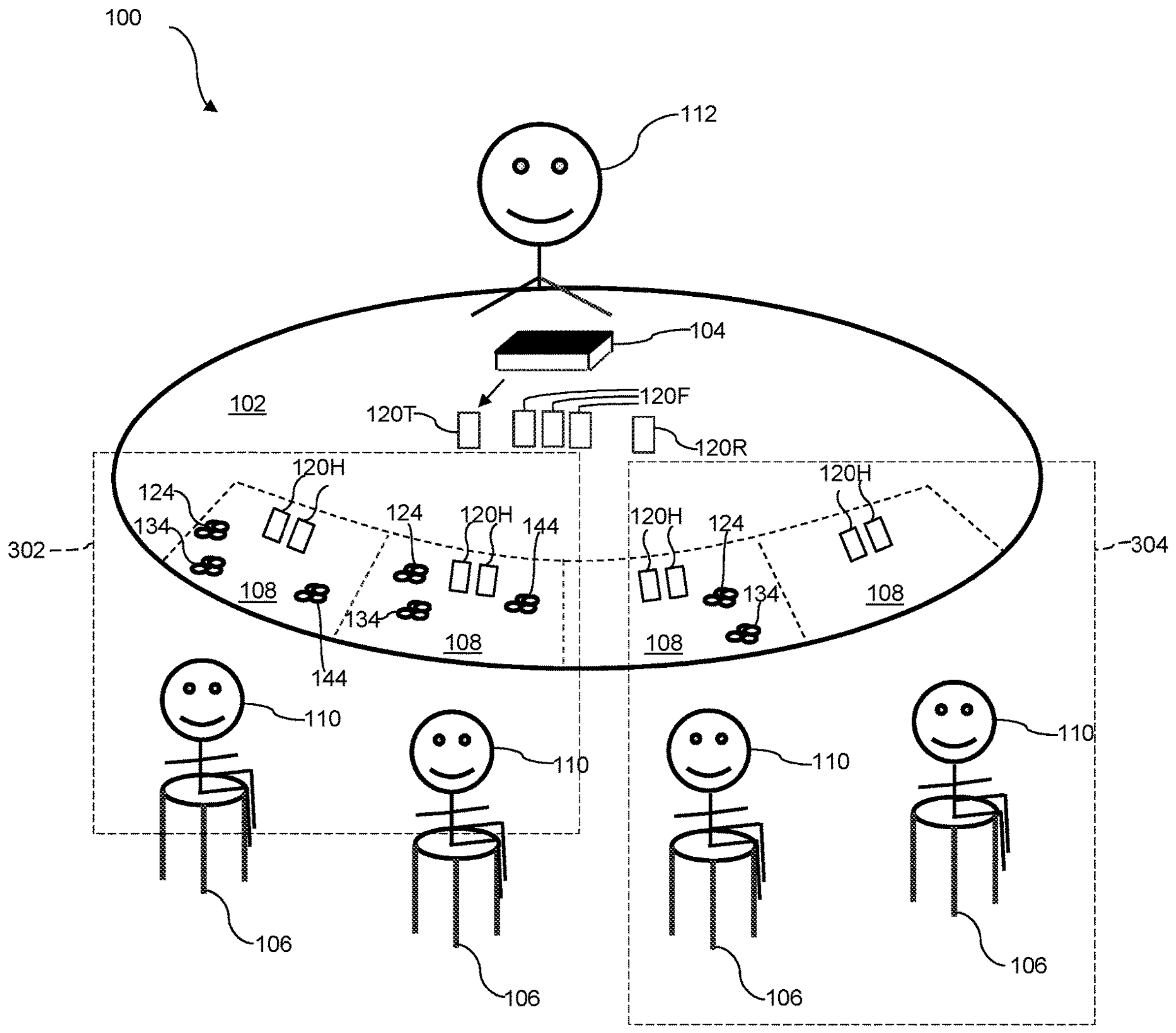
Figure 5G:
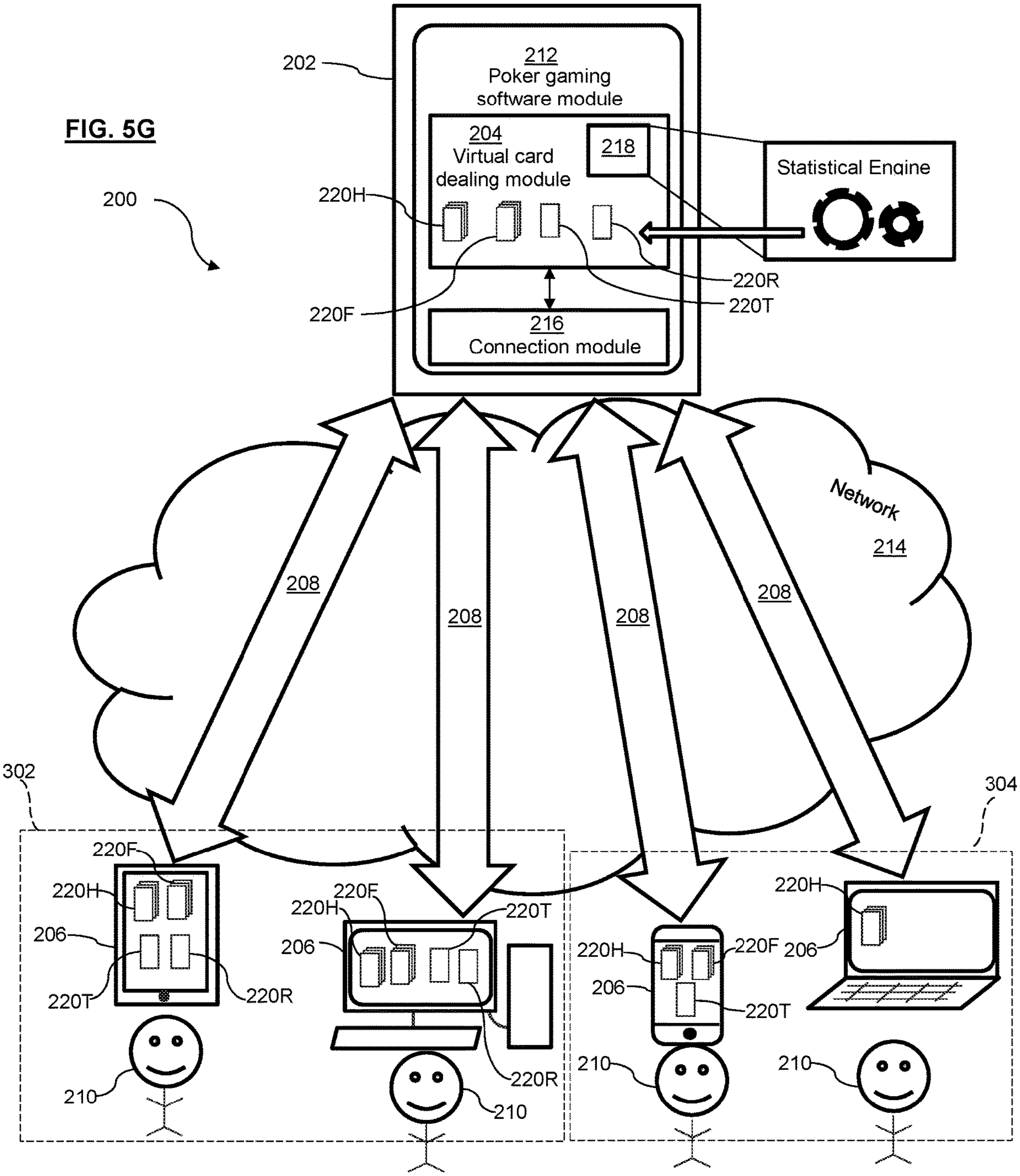

At sub-step 302G, the method 300 provides a primary river card visible to at least all unfolded players. In a physical poker gaming environment, as shown in FIG. 4G, an exemplary implementation of step 302G comprises the dealer 112 dealing another physical card 120R from the deck 104 face up onto the table 102 so as to be visible to all unfolded players 110. Optionally, a burn card may be drawn before drawing the river card 120R. In a computerized poker gaming environment, as shown in FIG. 5G, an exemplary implementation of step 302G comprises the poker gaming software module 212 communicating a virtual card 220R from the virtual card dealing module 204 to the player computer systems 206 of the unfolded players 210 via the remote communications connections 208.

Figure 4H:
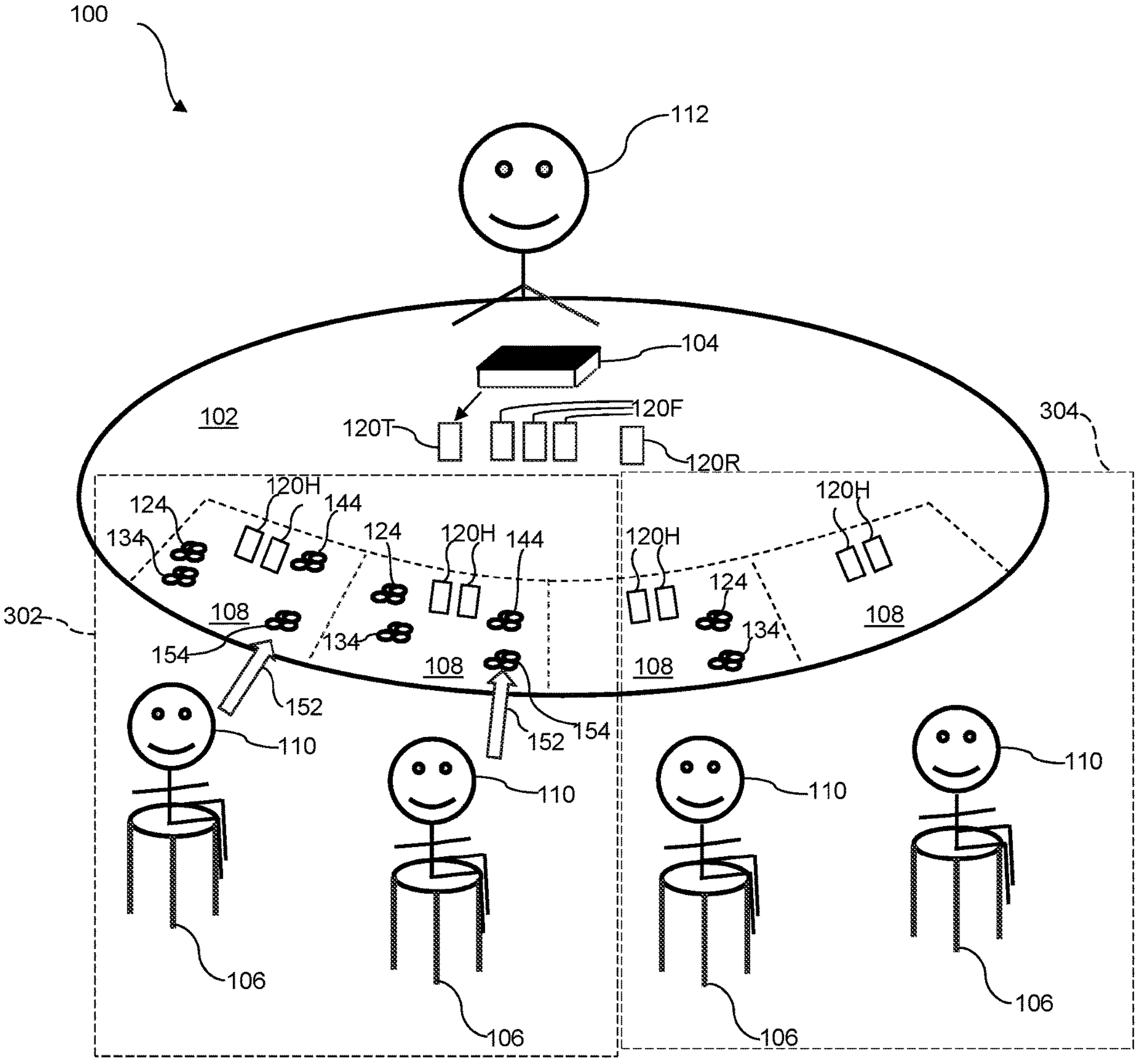
Figure 5H:
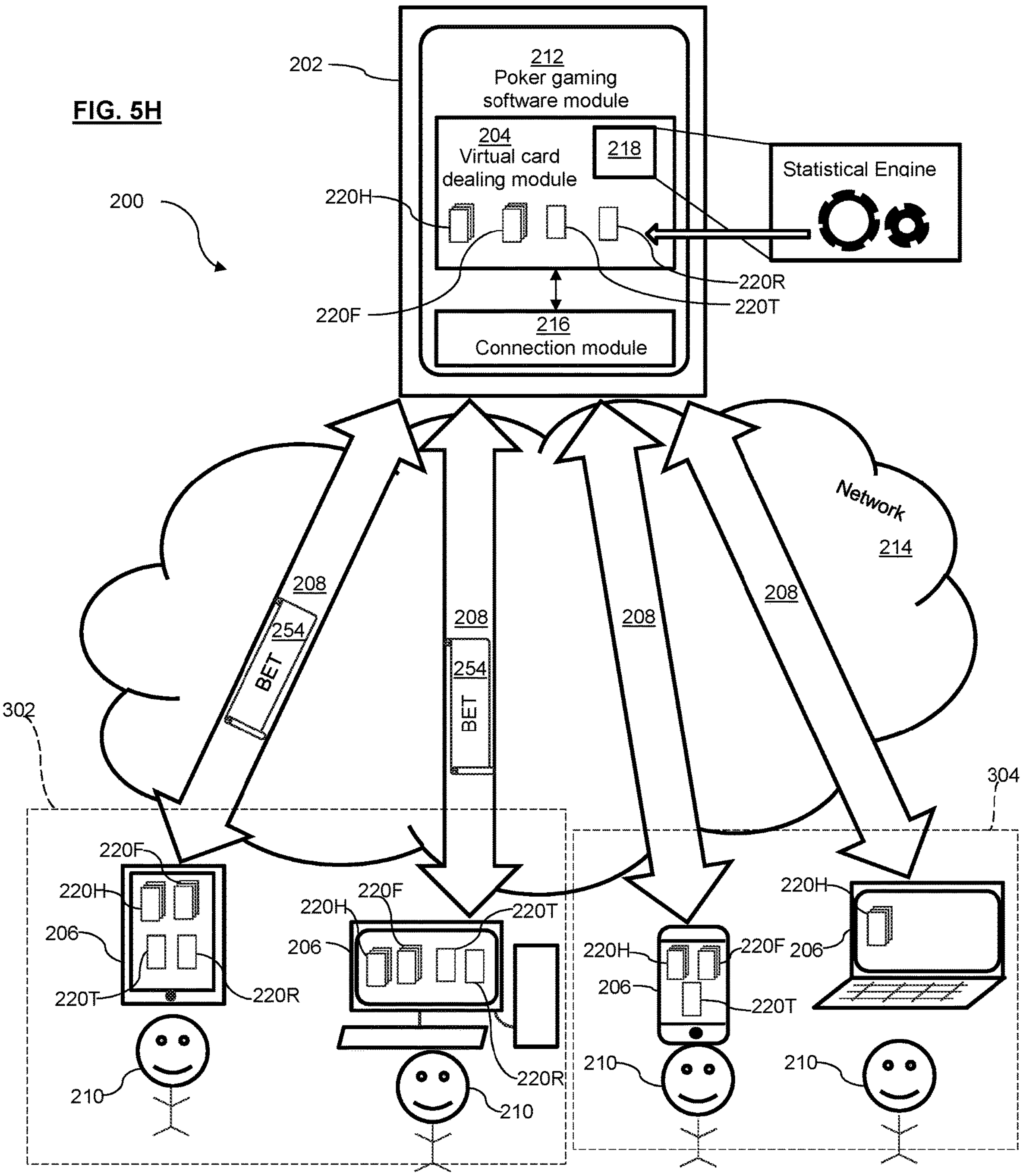
Figure 5I:
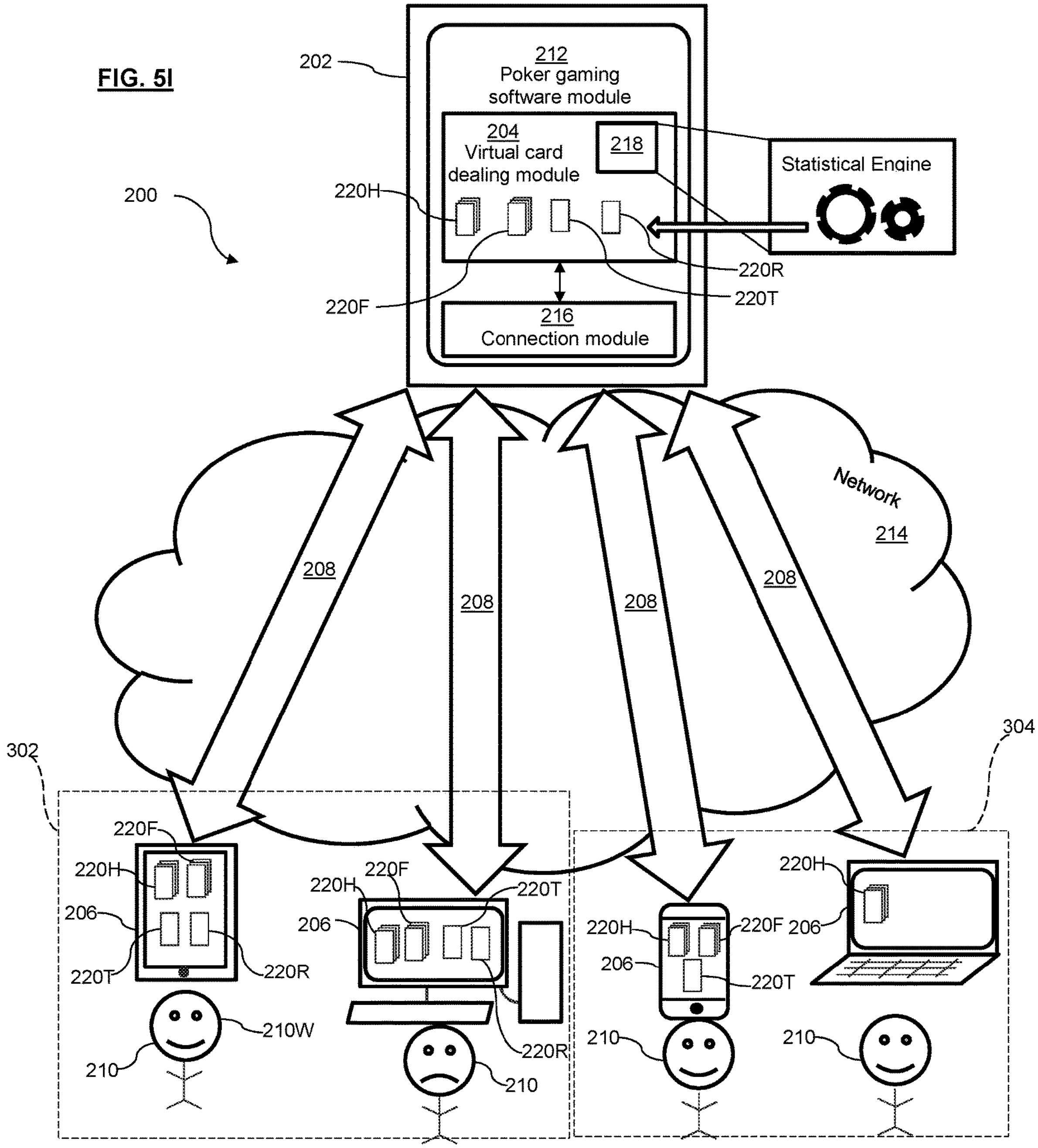

At sub-step 302H, the method 300 receives, from each unfolded player, a primary river card election. The primary river card election is either a primary river card bet or a primary river card fold. In a physical poker gaming environment, as shown in FIG. 4H, an exemplary implementation of sub-step 302H comprises the remaining unfolded players 110 indicating a primary river card bet by, for example, placing 152 chips 154 or other indicia of value on the table 102 or indicating a primary river card fold by, for example, verbally notifying the dealer 112 and the other players 110 (in FIG. 4H no players 110 fold at step 302H). In a computerized poker gaming environment, as shown in FIG. 5H, an exemplary implementation of step 302H comprises the players 210 using their respective player computer systems 206 to communicate either the value of a primary river card bet 254, or the fact of a primary river card fold, to the poker gaming software module 212 via the remote communications connections 208 (in FIG. 5H no players 110 fold at step 302H).

Following sub-step 302H, the set 308 of folded players may have grown again, since any players who have folded out of the primary Texas Holdem round (step 302) at sub-step 302H are added to the set 308 of folded players. Depending on how many players, if any, have indicated a pre-primary flop fold at sub-step 302B, a post-primary flop fold at sub-step 302D, a primary river card fold at sub-step 302F and/or, a primary river card fold at sub-step 302H the set 308 of folded players may consist of a plurality of players, a single player, or no players (i.e. an empty set). As long as there are at least two players in the set 308 of folded players, these players may proceed to the secondary Texas Holdem round (step 304) as described further below.

Figure 4I:
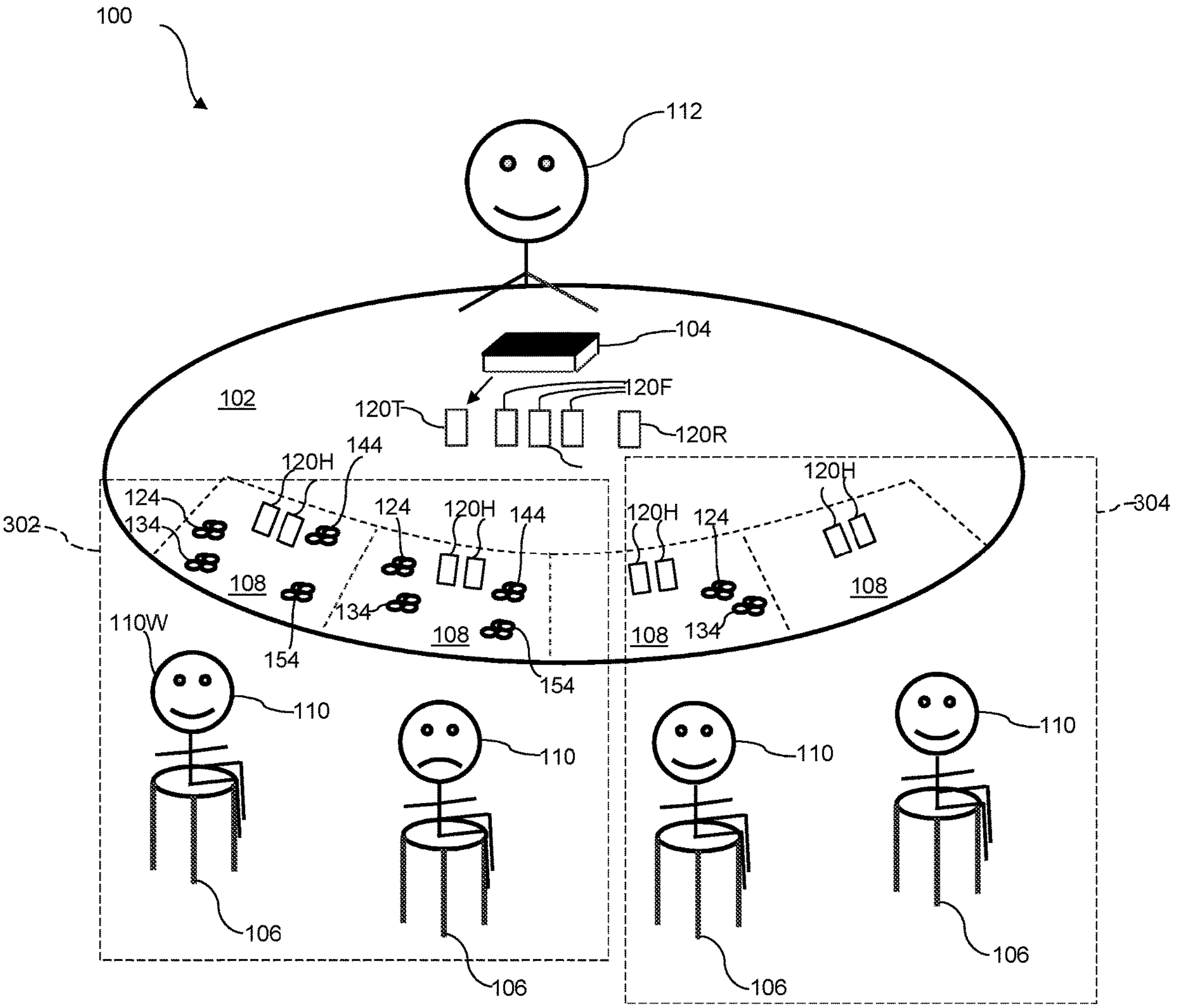

After sub-step 302H, the method 300 proceeds to sub-step 302I, where the winner (or winners) of the primary Texas Holdem round (step 302) are determined. Sub-step 302I may comprise a comparison of the players' hands without further betting or folding opportunities, or may provide one or more additional opportunities to bet or fold before such comparison. Eventually, the unfolded player(s) 110, 210 having the best hand(s) will be identified as the winner 110W, 210W, as shown in FIG. 4I for a physical poker gaming environment and in FIG. 5I for a computerized poker gaming environment.

Importantly, and in fact critically, the method 300 further comprises, at step 304, administering a secondary Texas Holdem poker round, concurrently with the primary Texas Holdem poker round (step 302), among at least a subset 310 of folded players. As noted above, there will be a set 308 of folded players, that is, players who have folded out of the primary Texas Holdem round (step 302) at sub-step 302B, 302D, 302F or 302H (typically, players who fold at sub-step 302I are not included in the set 308), and a subset 310 of these folded players can be provided with the option to participate in the secondary Texas Holdem poker round (step 304) while the primary Texas Holdem poker round (step 302) continues. The subset 310 may be only some members of the set 308 of folded players, or may be the entire set 308 of folded players, as will be explained further below.

Continuing to refer to FIG. 3, in sequence, the method 300 will now be described in more detail with respect to step 304, that is, administering a secondary Texas Holdem poker round, concurrently with the primary Texas Holdem poker round (step 302) shown in FIGS. 4A to 4I and 5A to 5I, among at least a subset 310 of folded players. Step 304 comprises sub-steps 304J through 304R.

At sub-step 304J, the method 300 generates a secondary flop consisting of three secondary flop cards; the secondary Texas Holdem poker round (step 304) utilizes this secondary flop. The secondary flop cards are preferably drawn from unused cards. As used in this context, the term "unused cards" refers to cards other than the hole cards, the primary flop cards, the primary turn card and the primary river card. In a physical poker gaming environment, as shown in FIGS. 4F through 4I, an exemplary implementation of sub-step 304J comprises the dealer 112 placing three physical cards face up on the table 102 so as to be visible to all players 110 participating in the a secondary Texas Holdem poker round (the cards may also be visible to players in the primary Texas Holdem poker round). These three physical cards may be dealt from the deck 104 with or without burn cards or, if burn cards were used at sub-steps 302C, 302E and 302G, the burn cards may become the secondary flop cards. In a computerized poker gaming environment, as shown in FIGS. 5F through 5I), an exemplary implementation of sub-step 304J comprises the poker gaming software module 212 communicating three virtual cards from the virtual card dealing module 204 to the player computer systems 206 of the unfolded players 210 via the remote communications connections 208. Suitable programming of the statistical engine 218 ensures that the three virtual cards are unused cards. Generating the secondary flop (sub-step 304J) may occur at any time. For example, in some embodiments in a physical poker gaming environment the cards that will become the secondary flop may be drawn before the hole cards are drawn, or after the hole cards but before the primary flop, or after the primary flop and before the primary turn card, and so on. Moreover, in some embodiments in a physical poker gaming environment the secondary flop may be drawn from a different deck than the deck 104 used for the primary Texas Holdem poker round; in such embodiments suitable adjustment may be made to the rules to account for the possibility of duplicate cards. Similarly, in a computerized poker gaming environment the virtual card dealing module 204 can generate the secondary flop at any time, and can simulate, via the statistical engine 218, drawing the secondary flop cards from either the same virtual deck as was used for the primary Texas Holdem poker round, or a different virtual deck.

As can be seen in FIGS. 4F through 4I and 5F through 5I, during the secondary Texas Holdem poker round (step 304), the players 110, 210 participating in the secondary Texas Holdem poker round retain their respective hole cards 120H, 220H from the primary Texas Holdem poker round for the secondary Texas Holdem poker round, but the secondary Texas Holdem poker round utilizes the secondary flop.

The secondary Texas Holdem poker round can be played in a variety of ways, and may be an abbreviated Texas Holdem poker round, or a complete Texas Holdem poker round. An abbreviated Texas Holdem poker round may, for example, omit the river card, or may omit both the turn card and the river card (and related betting opportunities) and determine a winner based only on the hole cards and the primary flop. In the illustrated embodiment, simply for completeness of illustration, the secondary Texas Holdem poker round (step 304) is shown as a complete Texas Holdem poker round.

After the secondary flop is generated at sub-step 304J, the method 300 proceeds to sub-step 304K to receive, from each active player in the secondary Texas Holdem poker round, a pre-secondary-flop election, which may be a pre-secondary-flop bet or a pre-secondary-flop fold. The sub-step 304K is optional; in some embodiments this step may be omitted, for example if players are allowed to wait until the secondary flop is revealed before deciding whether to wager on the secondary Texas Holdem poker round, or if an initial wager is applied automatically (e.g. a portion of a wager from the primary Texas Holdem poker round may be carried over into the secondary Texas Holdem Poker round). After sub-step 304J and optional sub-step 304K, step 304 proceeds to sub-step 304L to reveal the secondary flop to the active players in the secondary Texas Holdem poker round. Optionally, sub-step 304K may occur before sub-step 304J; the only timing requirement for generating the secondary flop (sub-step 304J) is that it occur before, or at least simultaneously with, revelation of the secondary flop at sub-step 304L.

Once the secondary flop is revealed at sub-step 304L, the method 300 proceeds to sub-step 304M to receive, from each player still participating in the secondary Texas Holdem poker round, a post-secondary-flop election. The post-secondary-flop election is either a post-secondary-flop bet or a post-secondary-flop fold. Next, at sub-step 304N, the method 300 provides a secondary turn card visible to at least each player still participating in the secondary Texas Holdem poker round. Then, at sub-step 304O, the method 300 receives, from each player still participating in the secondary Texas Holdem poker round, a secondary turn card election. The secondary turn card election is either a secondary turn card bet or a secondary turn card fold. Next, at sub-step 304P, the method 300 provides a secondary river card visible to at least each player still participating in the secondary Texas Holdem poker round, and then at sub-step 304P, the method 300 receives, from each player still participating in the secondary Texas Holdem poker round, a secondary river card election. The secondary river card election is either a secondary river card bet or a secondary river card fold. Sub-steps 304L to 304Q may be carried out analogously to sub-step 302C to 302I in either a physical poker gaming environment or a computerized poker gaming environment. At sub-step 304R, the method 300 determines the winner(s) of the secondary Texas Holdem poker round (step 304). Similarly to sub-step 302I, sub-step 304R may comprise a comparison of the players' hands without further betting or folding opportunities, or may provide one or more additional opportunities to bet or fold before such comparison.

As noted above, the method 300 administers a secondary Texas Holdem poker round (step 304) concurrently with the primary Texas Holdem poker round (step 302), with the secondary Texas Holdem poker round being administered among at least a subset 310 of the set 308 of players who have folded out of the primary Texas Holdem poker round. The purpose of the concurrent secondary Texas Holdem poker round (step 304) is to utilize at least one resource from the primary Texas Holdem poker round that would be otherwise idle. In some embodiments, as shown in FIGS. 4A to 4I, the primary Texas Holdem poker round (step 302) and the secondary Texas Holdem poker round (step 304) are both physical games played at a table 102 with physical playing cards 104 and the at least one otherwise idle resource from the primary Texas Holdem poker round comprises the table positions 108 of folded players 110 at the table 102. In other embodiments, as shown in FIGS. 5A to 5I, the primary Texas Holdem poker round (step 302) and the secondary Texas Holdem poker round (step 304) are both computerized poker games played with virtual playing cards 220 by way of remote communication connections 208 between a dealer computer system 202 and player computer systems 206 associated with the players 210, and the at least one otherwise idle resource from the primary Texas Holdem poker round comprises the remote communication connections 208 between the dealer computer system 202 and the player computer systems 206 associated with players 210 who have folded out of the primary Texas Holdem poker round.

The subset 310 of the set 308 of players who have folded out of the primary Texas Holdem poker round (step 302) and who participate in the secondary Texas Holdem poker round (step 304) may be selected in a variety of ways. For example, participation may be automatic (with the opportunity to fold out of the secondary Texas Holdem poker round) or may be voluntary, or may be random or quasi-random. Moreover, while one may of course end before the other, it is desirable to align the timing of the secondary Texas Holdem poker round (step 304) and the primary Texas Holdem poker round (step 302) so that they conclude as close to simultaneously as possible to limit idle resources in both rounds. Therefore, in some embodiments eligibility for the subset 310 of players who participate in the secondary Texas Holdem poker round (step 304) may depend on when the players folded out of the primary Texas Holdem poker round (step 302). For this reason, as noted above, players who fold out of the primary Texas Holdem poker round (step 302) at sub-step 302I are typically not included in the set 308, since sub-step 302I concludes the primary Texas Holdem poker round (step 302). However, additional limitations may be imposed. For example, the secondary Texas Holdem poker round (step 304) may be limited to players who folded out of the primary Texas Holdem poker round (step 302) at the pre-primary-flop election (sub-step 302B), or to players who folded out of the primary Texas Holdem poker round (step 302) at the pre-primary-flop election (sub-step 302B) or at the post-primary-flop election (sub-step 302D), or to players who folded out of the primary Texas Holdem poker round (step 302) at one of the pre-primary-flop election (sub-step 302B), the post-primary-flop election (sub-step 302D) and the primary turn card election sub-step 302F.

Figure 6:
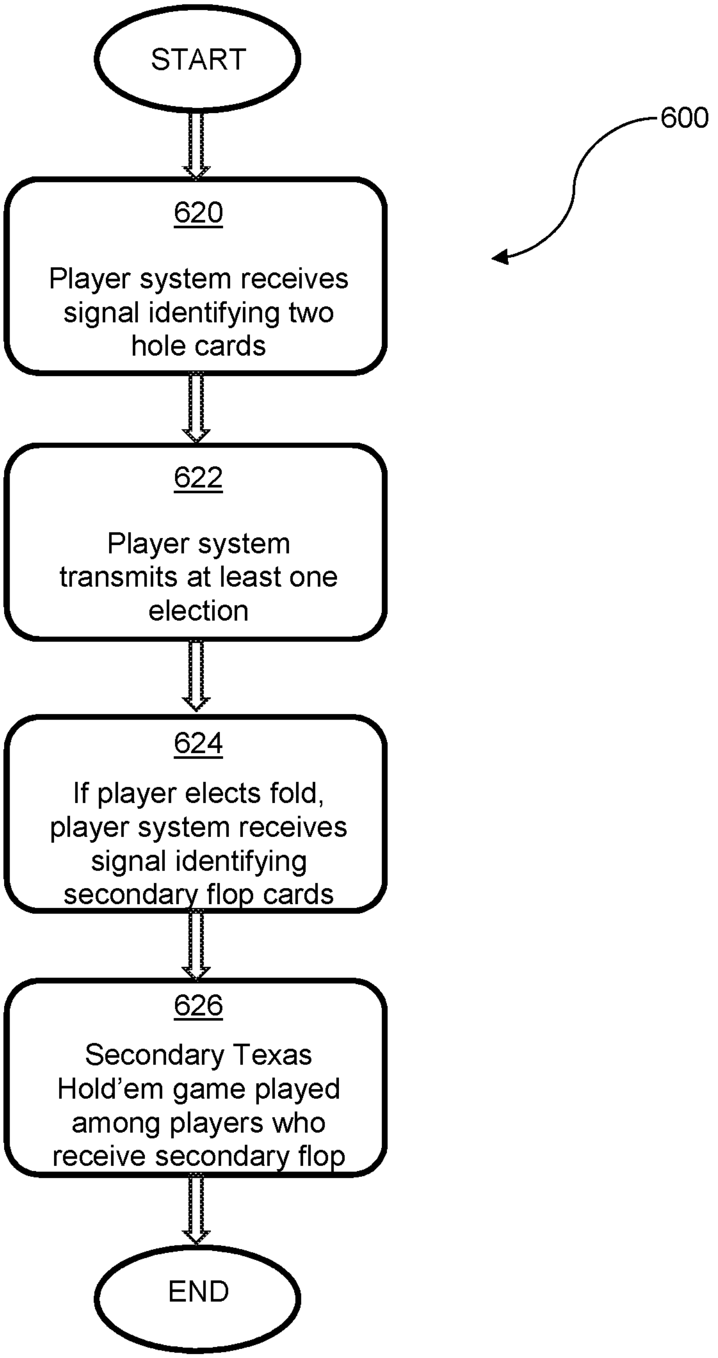
FIG. 6 illustrates, in flow chart form, from the perspective of a player computer system, an exemplary method for enhancing resource utilization in a computerized Texas Holdem poker game played with virtual playing cards by way of remote communication connection between a dealer computer system and the player computer system.

Reference is now made to FIG. 6. FIG. 6 illustrates, in flow chart form, an exemplary method 600 for enhancing resource utilization in a computerized Texas Holdem poker game played with virtual playing cards by way of remote communication connection between a dealer computer system and a player computer system (for example, the configuration shown in FIG. 2). The exemplary method 600 in FIG. 6 is illustrated from the perspective of the player computer system (for example, one of the player computer systems 206 shown in FIG. 2).

The method 600 comprises, at the player computer system, playing a primary Texas Holdem poker round by carrying out a series of steps 620 to 626. At step 620, a signal identifying a set of two hole cards is received at the player computer system. The identified hole cards (virtual cards) can then be displayed on a GUI executing on the player computer system. At step 622 of the method 600, responsive to input from the player, at least one election is transmitted from the player computer system. Each election is either a bet or a fold. There may be only one election, for example if the player folds at the pre-primary-flop election (sub-step 302B), or multiple elections if the player places a bet at the pre-primary-flop election and continues in the primary Texas Holdem poker round (step 302).

After a player folds, he or she may be eligible to participate in the secondary Texas Holdem poker round (step 304). Responsive to an election that is a fold and which makes the player eligible for the secondary Texas Holdem poker round, at step 624 the method 600 receives, at the player computer system, a signal identifying a secondary flop consisting of three secondary flop cards (virtual cards). The secondary flop cards are drawn from unused cards, wherein the unused cards are cards other than primary flop cards, a primary turn card and a primary river card from the primary Texas Holdem poker round. Then, at step 626, while unfolded players concurrently play the primary Texas Holdem poker game, a secondary Texas Holdem poker game is played at the player computer system among at least a subset of other folded players (who use their respective computer systems) and in which the player computer system retains the hole cards (virtual cards) from the primary Texas Holdem poker game for the secondary Texas Holdem poker game and the secondary Texas Holdem poker game utilizes the secondary flop. The secondary Texas Holdem poker game utilizes the remote communication connection between the dealer computer system and the player computer system.

The above description provides merely an exemplary overview to facilitate understanding of the present technology for enhancing resource utilization in gaming applications, and is not intended to be exhaustive or to exclude other implementations falling within the scope of the claims. For example, additional opportunities to bet or fold in the primary Texas Holdem poker game and/or the secondary Texas Holdem poker game may be provided. Other features from Texas Holdem poker, such as (for example and without limitation) raises (with or without caps), cap games, blinds, buy-ins, calls, checks, chops, darks, fixed limit games, family pot games, ante/forced bet games, and so on, may also be incorporated into games implementing the presently described technology.

As can be seen from the above description, the systems and methods described herein represent significantly more than abstract methods of organizing human activity, and more than merely a new set of rules for a card game. The systems and methods described are in fact an improvement to the technology of physical and computer-implemented multi-player card games, as they provide for increased resource utilization. This facilitates the ability of the game administrator to make more efficient use of the resources implicated in providing the games. Moreover, the technology is applied by using particular apparatus, namely physical tables and playing cards and dealer computer systems that are programmed to implement digitally simulated playing cards. As such, the claimed technology is confined to physical and online gaming applications.

As noted above, in some preferred embodiments, aspects of the present technology may be implemented in a computerized poker gaming environment. As such, the present technology may be embodied within a system, a method, a computer program product or any combination thereof. The computer program product may include a computer readable storage medium or media having computer readable program instructions thereon for causing a processor to carry out aspects of the present technology. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language or a conventional procedural programming language. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present technology.

Aspects of the present technology have been described above with reference to flowchart illustrations and/or block diagrams of methods, apparatus (systems) and computer program products according to various embodiments. In this regard, the flowchart and block diagrams in the Figures illustrate the architecture, functionality, and operation of possible implementations of systems, methods and computer program products according to various embodiments of the present technology. For instance, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Some specific examples of the foregoing may have been noted above but any such noted examples are not necessarily the only such examples. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
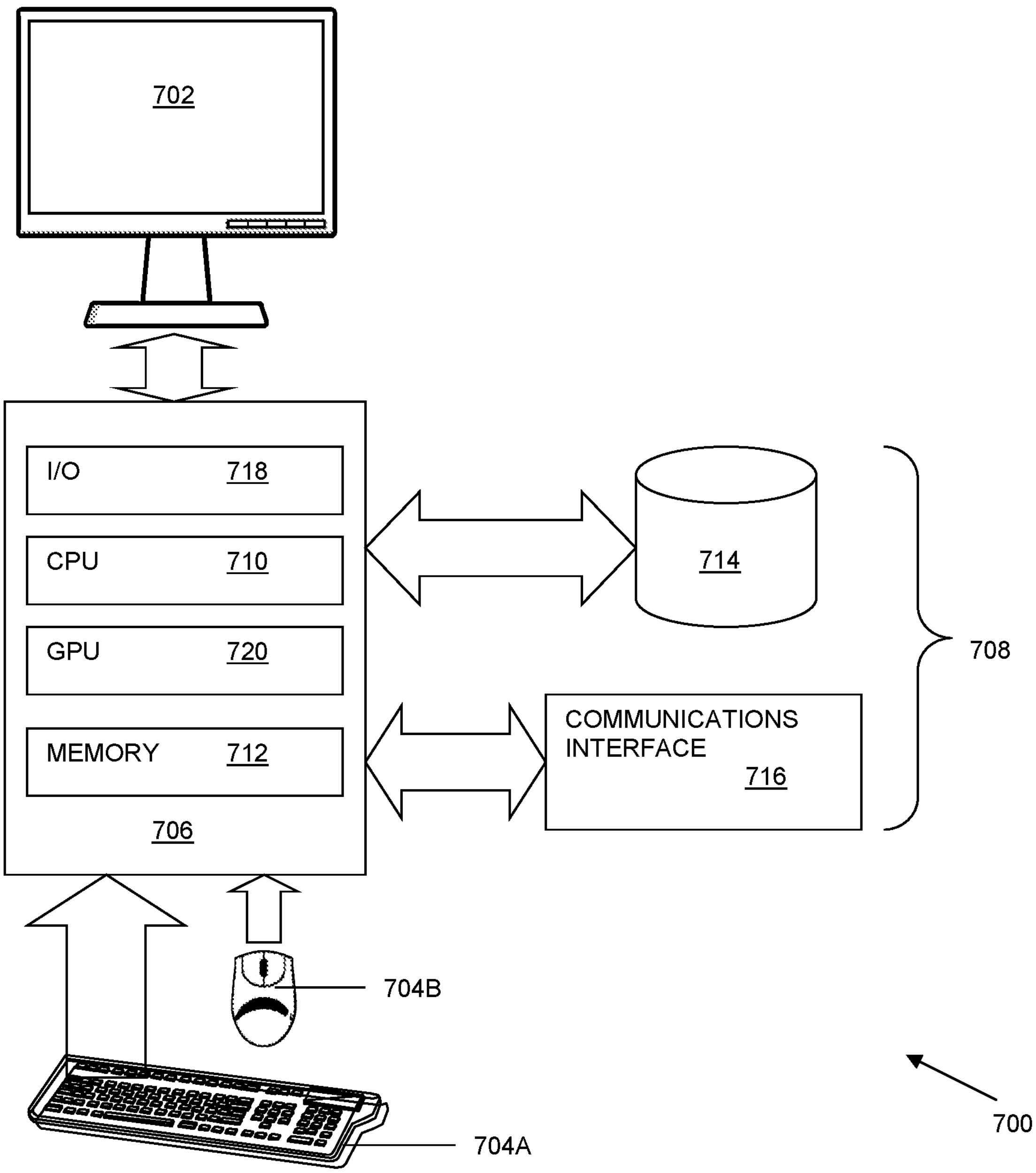
FIG. 7 shows, in schematic form, an exemplary computer system in respect of which aspects of the present technology may be implemented.

An illustrative computer system in respect of which the technology herein described may be implemented is presented as a block diagram in FIG. 7. The illustrative computer system is denoted generally by reference numeral 700 and includes a display 702, input devices in the form of keyboard 704A and pointing device 704B, computer 706 and external devices 708. While pointing device 704B is depicted as a mouse, it will be appreciated that other types of pointing device may also be used.

The computer 706 may contain one or more processors or microprocessors, such as a central processing unit (CPU) 710. The CPU 710 performs arithmetic calculations and control functions to execute software stored in an internal memory 712, preferably random access memory (RAM) and/or read only memory (ROM), and possibly additional memory 714. The additional memory 714 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 714 may be physically internal to the computer 706, or external as shown in FIG. 7, or both.

The computer system 700 may also include other similar means for allowing computer programs or other instructions to be loaded. Such means can include, for example, a communications interface 716 which allows software and data to be transferred between the computer system 700 and external systems and networks. Examples of communications interface 716 can include a modem, a network interface such as an Ethernet card, a wireless communication interface, or a serial or parallel communications port. Software and data transferred via communications interface 716 are in the form of signals which can be electronic, acoustic, electromagnetic, optical or other signals capable of being received by communications interface 716. Multiple interfaces, of course, can be provided on a single computer system 700.

Input and output to and from the computer 706 is administered by the input/output (I/O) interface 718. This I/O interface 718 administers control of the display 702, keyboard 704A, external devices 708 and other such components of the computer system 700. The computer 706 also includes a graphical processing unit (GPU) 720. The latter may also be used for computational purposes as an adjunct to, or instead of, the (CPU) 710, for mathematical calculations.

The various components of the computer system 700 are coupled to one another either directly or by coupling to suitable buses.

Figure 8:
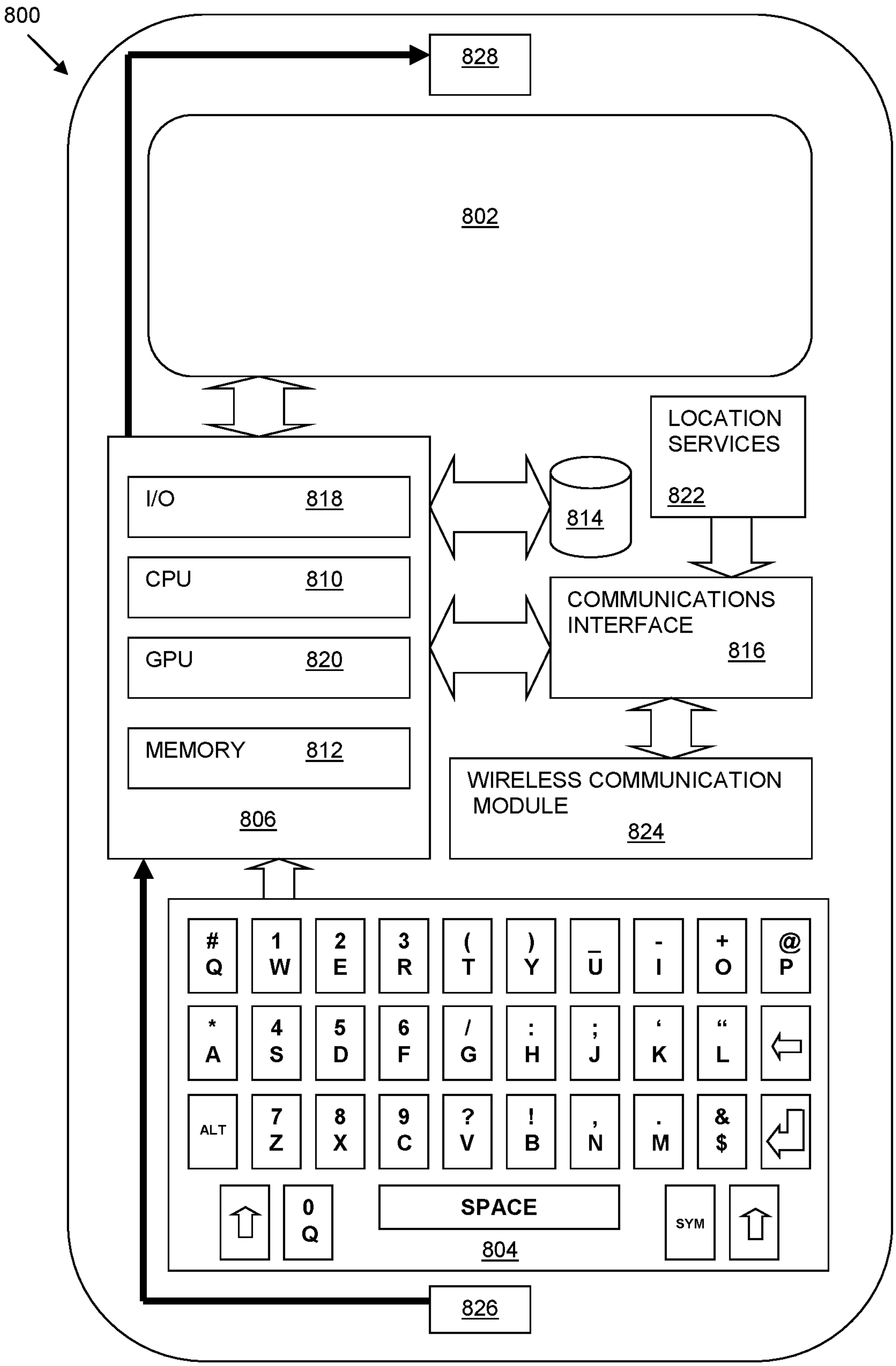
FIG. 8 shows, in schematic form, an exemplary smartphone in respect of which aspects of the present technology may be implemented.

FIG. 8 shows an exemplary networked mobile wireless telecommunication computing device in the form of a smartphone 800. The smartphone 800 includes a display 802, an input device in the form of keyboard 804 and an onboard computer system 806. The display 802 may be a touchscreen display and thereby serve as an additional input device, or as an alternative to the keyboard 804. The onboard computer system 806 comprises a central processing unit (CPU) 810 having one or more processors or microprocessors for performing arithmetic calculations and control functions to execute software stored in an internal memory 812, preferably random access memory (RAM) and/or read only memory (ROM), and is coupled to additional memory 814 which will typically comprise flash memory, which may be integrated into the smartphone 800 or may comprise a removable flash card, or both. The smartphone 800 also includes a communications interface 816 which allows software and data to be transferred between the smartphone 800 and external systems and networks. The communications interface 816 is coupled to one or more wireless communication modules 824, which will typically comprise a wireless radio for connecting to one or more of a cellular network, a wireless digital network or a Wi-Fi network. The communications interface 816 will also typically enable a wired connection of the smartphone 800 to an external computer system. A microphone 826 and speaker 828 are coupled to the onboard computer system 806 to support the telephone functions managed by the onboard computer system 806, and a location services module 822 (e.g. including GPS receiver hardware) may also be coupled to the communications interface 816 to support navigation or other location-based operations by the onboard computer system 806. Input and output to and from the onboard computer system 806 is administered by the input/output (I/O) interface 818, which administers control of the display 802, keyboard 804, microphone 826 and speaker 828. The onboard computer system 806 may also include a separate graphical processing unit (GPU) 820. The various components are coupled to one another either directly or by coupling to suitable buses.

The term "computer system" and related terms, as used herein, is not limited to any particular type of computer system and encompasses servers, desktop computers, laptop computers, networked mobile wireless telecommunication computing devices such as smartphones, tablet computers, as well as other types of computer systems.

Thus, computer readable program code for implementing aspects of the technology described herein may be contained or stored in the memory 812 of the onboard computer system 806 of the smartphone 800 or the memory 712 of the computer 806, or on a computer usable or computer readable medium external to the onboard computer system 76 of the smartphone 800 or the computer 706, or on any combination thereof.

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiment was chosen and described in order to best explain the principles of the technology and the practical application, and to enable others of ordinary skill in the art to understand the technology for various embodiments with various modifications as are suited to the particular use contemplated.

While the foregoing description, has described certain exemplary embodiments, nothing in the description is intended to imply that any particular example is lawful in any particular jurisdiction, and is certainly not intended to authorize, suggest or even intimate that any person engage in any unlawful gambling activity. Rather, those persons implementing the technology described herein are expected to familiarize themselves with all applicable legislation, regulation and other governing authority and ensure that implementation of any technology described or claimed herein is in full compliance therewith.

Certain currently preferred embodiments have been described by way of example. It will be apparent to persons skilled in the art that a number of variations and modifications can be made without departing from the scope of the claims. In construing the claims, it is to be understood that, with respect to implementation of the technology in a physical poker gaming environment, the use of physical playing cards is essential, and with respect to implementation of the technology in a computerized poker gaming environment, the use of one or more computers to implement the embodiments described herein is essential.

What is claimed is:

1. A method for enhancing resource utilization in Texas Holdem poker, the method comprising:

administering a primary Texas Holdem poker round by, for a plurality of players:

providing a set of two hole cards for each player, wherein each set of two hole cards is associated with and visible by only a single player;

receiving, from each player, a pre-primary-flop election, the pre-primary-flop election being one of a pre-primary-flop bet or a pre-primary-flop fold;

providing a primary flop consisting of a set of three primary flop cards visible to at least all unfolded players;

receiving, from each unfolded player, a post-primary-flop election, the post-primary-flop election being one of a post-primary-flop bet or a post-primary-flop fold;

providing a primary turn card visible to at least all unfolded players;

receiving, from each unfolded player, a primary turn card election, the primary turn card election being one of a primary turn card bet or a primary turn card fold;

providing a primary river card visible to at least all unfolded players;

receiving, from each unfolded player, a primary river card election, the primary river card election being one of a primary river card bet or a primary river card fold;

generating a secondary flop consisting of three secondary flop cards;

concurrently with the primary Texas Holdem poker round, administering a secondary Texas Holdem poker round among at least a subset of folded players, wherein:

the at least a subset of folded players retain their respective hole cards from the primary Texas Holdem poker round for the secondary Texas Holdem poker round; and the secondary Texas Holdem poker round utilizes the secondary flop;

wherein the secondary Texas Holdem poker round utilizes at least one otherwise idle resource from the primary Texas Holdem poker round.

2. The method of claim 1, wherein:

the primary Texas Holdem poker round and the secondary Texas Holdem poker round are both physical games played at a table with physical playing cards; and the at least one otherwise idle resource from the primary Texas Holdem poker round comprises table positions of folded players at the table.

3. The method of claim 1, wherein:

the primary Texas Holdem poker round and the secondary Texas Holdem poker round are both computerized poker games played with virtual playing cards by way of remote communication connections between a dealer computer system and player computer systems associated with the players; and the at least one otherwise idle resource from the primary Texas Holdem poker round comprises the remote communication connections between the dealer computer system and the player computer systems associated with at the least a subset of folded players.

4. The method of claim 1, wherein the secondary flop cards are drawn from unused cards, wherein the unused cards are cards other than the hole cards, the primary flop cards, the primary turn card and the primary river card.

5. A method for enhancing resource utilization in Texas Holdem poker, the method comprising:

in a computerized Texas Holdem poker game played with virtual playing cards by way of remote communication connection between a dealer computer system and a player computer system:

at the player computer system, playing a primary Texas Holdem poker round by:

receiving, at the player computer system, a signal identifying a set of two hole cards;

transmitting, from the player computer system, at least one election, each election being one of a bet or a fold;

responsive to a fold, receiving, at the player computer system, a signal identifying a secondary flop consisting of three secondary flop cards, wherein the secondary flop cards are drawn from unused cards, wherein the unused cards are cards other than primary flop cards, a primary turn card and a primary river card from the primary Texas Holdem poker round;

at the player computer system, while unfolded players concurrently play the primary Texas Holdem poker game, playing a secondary Texas Holdem poker game among at least a subset of other folded players, wherein:

the player computer system retains the hole cards from the primary Texas Holdem poker game for the secondary Texas Holdem poker game; and the secondary Texas Holdem poker game utilizes the secondary flop;

wherein the secondary Texas Holdem poker game utilizes the remote communication connection between the dealer computer system and the player computer system.

6. A method for enhancing resource utilization in Texas Holdem poker, the method comprising:

administering a primary Texas Holdem poker round for a plurality of players;

concurrently with the primary Texas Holdem poker round, administering a secondary Texas Holdem poker round among at least a subset of folded players who have folded out of the primary Texas Holdem poker round, wherein:

the at least a subset of folded players retain their respective hole cards from the primary Texas Holdem poker round for the secondary Texas Holdem poker round; and the secondary Texas Holdem poker round utilizes at least one otherwise idle resource from the primary Texas Holdem poker round; wherein:

the primary Texas Holdem poker round and the secondary Texas Holdem poker round are both physical games played at a table with physical playing cards; and the at least one otherwise idle resource from the primary Texas Holdem poker round comprises table positions of folded players at the table.

7. A method for enhancing resource utilization in Texas Holdem poker, the method comprising:

administering a primary Texas Holdem poker round for a plurality of players;

concurrently with the primary Texas Holdem poker round, administering a secondary Texas Holdem poker round among at least a subset of folded players who have folded out of the primary Texas Holdem poker round, wherein:

the at least a subset of folded players retain their respective hole cards from the primary Texas Holdem poker round for the secondary Texas Holdem poker round; and the secondary Texas Holdem poker round utilizes at least one otherwise idle resource from the primary Texas Holdem poker round; wherein:

the primary Texas Holdem poker round and the secondary Texas Holdem poker round are both computerized poker games played with virtual playing cards by way of remote communication connections between a dealer computer system and player computer systems associated with the players; and the at least one otherwise idle resource from the primary Texas Holdem poker round comprises the remote communication connections between the dealer computer system and the player computer systems associated with at the least a subset of folded players.

* * * * *